United States Patent
Tang et al.

(10) Patent No.: US 12,391,779 B2
(45) Date of Patent: *Aug. 19, 2025

(54) ETHYLENE PROPYLENE DIENE MONOMER (EPDM) AND NONCONJUGATED DIENE COPOLYMERS AND METHODS FOR MAKING SAME

(71) Applicant: Lion Copolymer Geismar, LLC, Geismar, LA (US)

(72) Inventors: Solomon H. K. Tang, Geismar, LA (US); Willie Charles Burton, Geismar, LA (US); Alrica L. J. Payne, Geismar, LA (US); Michael Durousseau, Geismar, LA (US)

(73) Assignee: Lion Copolymers Holdings, LLC, Geismar, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/746,829

(22) Filed: Jun. 18, 2024

(65) Prior Publication Data
US 2024/0336715 A1    Oct. 10, 2024

Related U.S. Application Data

(63) Continuation-in-part of application No. 17/975,261, filed on Oct. 27, 2022, now Pat. No. 12,049,554.
(Continued)

(51) Int. Cl.
C08F 210/16    (2006.01)
C08F 210/18    (2006.01)
(Continued)

(52) U.S. Cl.
CPC ............ C08F 210/18 (2013.01); C08L 23/16 (2013.01); *C08F 2500/17* (2013.01);
(Continued)

(58) Field of Classification Search
CPC ......... C08F 210/18; C08L 23/16; C08L 23/26
See application file for complete search history.

(56) References Cited

U.S. PATENT DOCUMENTS

| | | | | |
|---|---|---|---|---|
| 5,563,217 A | * | 10/1996 | Davis | B32B 3/06 428/521 |
| 8,530,550 B2 | * | 9/2013 | Sannomiya | C08L 23/16 524/265 |
| 2009/0234073 A1 | * | 9/2009 | Matsui | C09K 3/10 526/89 |

FOREIGN PATENT DOCUMENTS

WO    WO-2015118912 A1  *  8/2015   ....... B29C 45/14311

* cited by examiner

*Primary Examiner* — Rip A Lee
(74) *Attorney, Agent, or Firm* — Kean Miller LLP; Robert Devin Ricci; Lauren J. Rucinski

(57) ABSTRACT

Disclosed herein are EPDM-diene copolymers that have a low molecular weight and are liquid at room temperature. In a specific embodiment, the method of making the copolymer includes: adding a solvent to a reactor; adding a propylene and a catalyst mixture to the solvent in the reactor to make a first reaction mixture, where the catalyst mixture includes: one or more catalysts, one or more cocatalysts, and one or more catalyst reactivators; contacting an ethylene to the first reaction mixture to make a second reaction mixture; and contacting a vinyl norbornene to the second reaction mixture to make a copolymer, where the copolymer has a molecular weight from about 2,500 g/mol to about 1,000,000 g/mol, and where the copolymer has a viscosity from about 1,000 cP to about 2,500,000 cP at 100° C.

19 Claims, 20 Drawing Sheets

Related U.S. Application Data

(60) Provisional application No. 63/273,299, filed on Oct. 29, 2021.

(51) Int. Cl.
*C08L 23/16* (2006.01)
*C08L 23/26* (2025.01)

(52) U.S. Cl.
CPC ........... *C08F 2810/20* (2013.01); *C08L 23/26* (2013.01); *C08L 2205/025* (2013.01)

wavenumber, cm⁻¹ wavenumber, cm$^{-1}$ wavenumber, cm⁻¹ wavenumber, cm⁻¹

Table 18 K Response When Hydrogen a Chain Transfer Agent

| Run No | Time | H2 | K | ML | C3 | VNB | Tan Delta | MLRA | Mw | Mn | Mw/Mn | Branch |
|---|---|---|---|---|---|---|---|---|---|---|---|---|
| 707-1 | 9:30 | 0 | 68 | 47 | 38.4 | 0.63 | 0.43 | 1044 | | | | |
| 707-2 | 12:30 | 0 | 68 | 44 | 38.1 | 0.63 | 0.42 | 994 | 1000065 | 268321 | 3.964 | 1.372 |
| 707-3 | 13:00 | 0 | 54 | 53 | 38.2 | 0.65 | 0.42 | 1237 | | | | |
| 707-4 | 14:30 | 0 | 54 | 54 | 38.5 | 0.68 | 0.43 | 1197 | 943568 | 267789 | 3.55 | 1.303 |

FIGURE 13

Table 19 H2 Response

| Run No | Time | H2 | K | ML | C3 | VNB | Tan Delta | MLRA | Mw | Mn | Mw/Mn | Branch |
|---|---|---|---|---|---|---|---|---|---|---|---|---|
| 708-1 | 10:00 | 0 | 54 | 47 | 38.6 | 0.66 | 0.44 | 1028 | | | | |
| 708-2 | 10:30 | 0 | 54 | 48 | 38.3 | 0.67 | 0.43 | 1054 | 691036 | 179498 | 3.84 | 1.757 |
| 708-3 | 14:00 | 1.5 | 54 | 22.6 | 40 | 0.68 | 0.62 | 330 | | | | |
| 708-4 | 14:30 | 1.5 | 54 | 22.3 | 40.2 | 0.66 | 0.62 | 354 | 488666 | 134910 | 3.624 | 1.34 |
| 708-5 | 16:30 | 2.5 | 52 | 18.6 | 40.4 | 0.68 | 0.68 | 284 | | | | |
| 708-6 | 17:00 | 2.5 | 54 | 18.52 | 40.3 | 0.67 | 0.67 | 288 | | | | |
| 708-7 | 17:30 | 2.5 | 54 | 18 | 40.3 | 0.67 | 0.67 | 270 | 499987 | 191195 | 2.614 | 1.172 |

FIGURE 19

ETHYLENE PROPYLENE DIENE MONOMER (EPDM) AND NONCONJUGATED DIENE COPOLYMERS AND METHODS FOR MAKING SAME

CROSS-REFERENCE TO RELATED APPLICATIONS

This application is a continuation-in-part of U.S. patent application Ser. No. 17/975,261, filed Oct. 27, 2022 (now U.S. Pat. No. 12,049,554), which claims the benefit of U.S. Provisional Patent Application No. 63/273,299, filed Oct. 29, 2021, each of which is incorporated by reference herein in its entirety.

BACKGROUND

Field

Provided herein are ethylene, propylene, and non-conjugated diene copolymers, which can have low molecular weights and are in a liquid phase at room temperature.

Description of the Related Art

The polymer industry is constantly investigating new polymers for commercial applications. Ethylene propylene diene monomer (EPDM) is a synthetic polymer/rubber that has a wide range of applications due to its durability and flexibility. Generally, EPDM polymers focus on high molecular weight EPDM polymers; however, high molecular weight EPDM polymers are solid at room temperature, which limits their application in certain commercial products, such as coatings, adhesives, liquid injection molding, and additive manufacturing. Low molecular weight EPDM polymers have been created to fill some of these needs. For example, TRILENE® by LION ELASTOMERS® is a class of specialty lower molecular weight EPDM polymers that are available in liquid or free-flow powder form. TRILENE® liquid EPDM polymers are used in gear oils and greases, caulks, adhesives, roof coatings, high hardness compounds, reactive plasticizers and many other applications that require a low molecular weight liquid EPDM product having some of the characteristics of conventional EPDM. However, no high molecular weight EPDM polymers have been produced with high vinyl norbornene content (being greater than 3.0% mass) because of the high branching propensity of the vinyl norbornene monomer causes the polymer to form gel particles during the polymerization process.

Consequently, there is a need for new ethylene, propylene, and nonconjugated diene copolymer compositions, which have low molecular weights and are liquids at low temperatures.

SUMMARY

EPDM-diene copolymers that have low molecular weights and are liquid at lower temperatures, such as room temperature, are described. In a specific embodiment, the method of making the copolymer includes: adding a solvent to a reactor; adding a propylene and a catalyst mixture to the solvent in the reactor to make a first reaction mixture, where the catalyst mixture includes: one or more catalysts, one or more cocatalysts, and one or more catalyst reactivators; contacting an ethylene to the first reaction mixture to make a second reaction mixture; and contacting a vinyl norbornene to the second reaction mixture to make a copolymer, where the copolymer has a molecular weight from about 2,500 g/mol to about 1,000,000 g/mol, and where the copolymer has a viscosity from about 1,000 cP to about 2,500,000 cP at 100° C. In another specific embodiment, the method of making the copolymer includes contacting the copolymer with a curing agent to make a cured copolymer.

BRIEF DESCRIPTION OF THE DRAWINGS

For the purposes of promoting an understanding of the principles of the present disclosure, reference can be now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art can utilize their teachings. Therefore, no limitation of the scope of the present disclosure is thereby intended.

FIG. 13 is Table 18 showing the results for EPDM-VNB copolymers when hydrogen is used as a chain transfer agent.

FIG. 19 is Table 19 showing the results for EPDM-VNB copolymers when hydrogen is used as a chain transfer agent.

DETAILED DESCRIPTION

Figure 1:
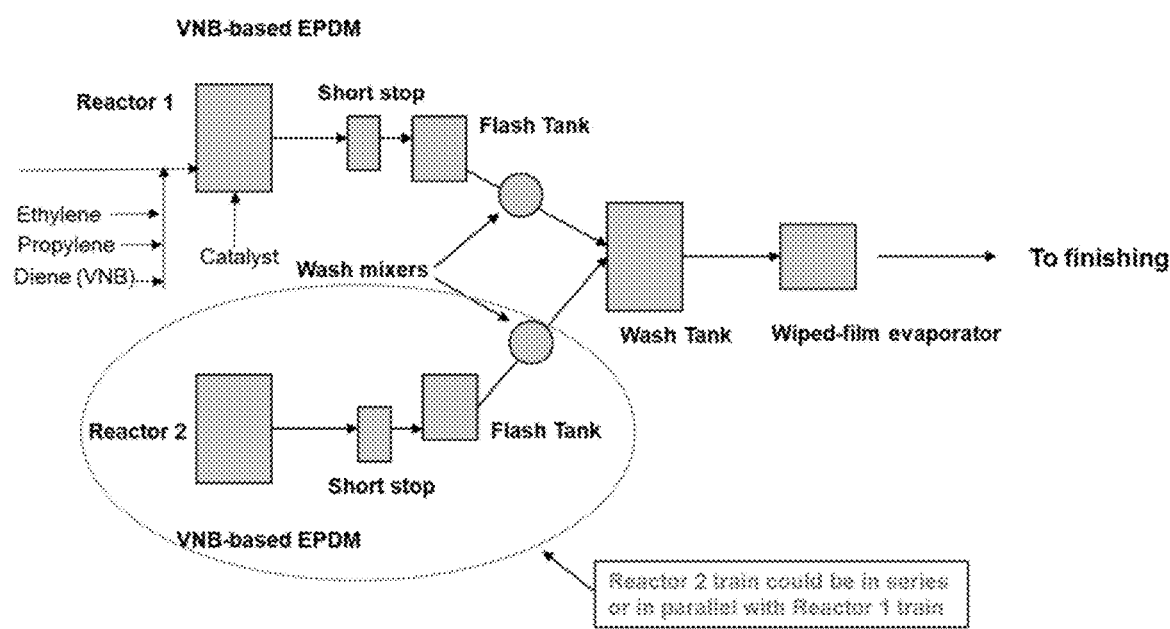
FIG. 1 is a flow diagram of an embodiment for making liquid EPDM-Vinyl Norbornene (VNB) copolymers.

In one or more embodiments, the EPDM-diene copolymer can include, but is not limited to: one or more ethylenes, one or more propylenes, one or more vinyl norbornene monomers, one or more ethylidene norbornene, one or more dicyclopentadienes, one or more EPDM polymers, one or more EPDM rubbers, one or more diene copolymers, one or more catalysts, one or more cocatalysts, one or more catalyst reactivators, one or more solvents, one or more hydrogens, one or more curing agents, one or more additives, and mixtures thereof. In some embodiments, the EPDM-diene copolymer can include, but is not limited to: a copolymer, a block copolymer, a terpolymer, and mixtures thereof. In some embodiments, the EPDM-diene copolymer can be a liquid at room temperature. In some embodiments, the EPDM-diene copolymer can be a solid at room temperature. In some embodiments, the EPDM-diene copolymer is capable of being cured to form crosslinked blends of compatible polymers. In some embodiments, the EPDM-diene copolymer can be crosslinked with one or more crosslinking agents.

The EPDM-diene copolymer can have a weight-average molecular weight ($M_w$) that varies widely. For example, the EPDM-diene copolymer can have a weight-average molecular weight from a low of about 10,000 g/mol, about 35,000 g/mol, or about 40,000 g/mol, to a high of about 800,000 g/mol, about 900,000 g/mol, or about 1,200,000 g/mol. In another example, the EPDM-diene copolymer can have a weight-average molecular weight that is less than 80,000 g/mol, less than 60,000 g/mol, or less than 50,000 g/mol. In another example, the EPDM-VNB copolymer can have a weight-average molecular weight from about 8,000 g/mol to about 250,000 g/mol, about 30,000 g/mol to about 1,200,000 g/mol, about 20,000 g/mol to about 80,000 g/mol, about 40,000 g/mol to about 80,000 g/mol, about 100,000 g/mol to about 750,000 g/mol, about 480,000 g/mol to about 1,100,000 g/mol, about 500,000 g/mol to about 1,000,000 g/mol.

The molecular weight of the EPDM-diene copolymer can be measured by gel permeation chromatography with tri-detectors.

The EPDM-diene copolymer can have a number-average molecular weight ($M_n$) that varies widely. For example, the EPDM-diene copolymer can have a number-average molecular weight from a low of about 1,100 g/mol, about 35,000 g/mol, or about 40,000 g/mol, to a high of about 800,000 g/mol, about 900,000 g/mol, or about 1,200,000 g/mol. In another example, the EPDM-VNB copolymer can have a number-average molecular weight that is less than 80,000 g/mol, less than 60,000 g/mol, or less than 50,000 g/mol. In another example, the EPDM-diene copolymer can have a number-average molecular weight from about 1,100 g/mol to about 250,000 g/mol, about 30,000 g/mol to about 1,200,000 g/mol, about 20,000 g/mol to about 80,000 g/mol, about 40,000 g/mol to about 80,000 g/mol, about 100,000 g/mol to about 750,000 g/mol, about 480,000 g/mol to about 1,100,000 g/mol, about 500,000 g/mol to about 1,000,000 g/mol.

The EPDM-diene copolymer can have a higher-average molecular weight ($M_z$) that varies widely. For example, the EPDM-diene copolymer can have a higher-average molecular weight from a low of about 10,000 g/mol, about 35,000 g/mol, or about 40,000 g/mol, to a high of about 800,000 g/mol, about 900,000 g/mol, or about 1,200,000 g/mol. In another example, the EPDM-diene copolymer can have a number-average molecular weight that is less than 80,000 g/mol, less than 60,000 g/mol, or less than 50,000 g/mol. In another example, the EPDM-diene copolymer can have a higher-average molecular weight from about 8,000 g/mol to about 250,000 g/mol, about 30,000 g/mol to about 1,200,000 g/mol, about 20,000 g/mol to about 80,000 g/mol, about 40,000 g/mol to about 80,000 g/mol, about 100,000 g/mol to about 750,000 g/mol, about 480,000 g/mol to about 1,100,000 g/mol, about 500,000 g/mol to about 1,000,000 g/mol.

The EPDM-diene copolymer can have a molecular weight of the highest peak (Mp) that varies widely. For example, the EPDM-diene copolymer can have a molecular weight of the highest peak from a low of about 10,000 g/mol, about 35,000 g/mol, or about 40,000 g/mol, to a high of about 800,000 g/mol, about 900,000 g/mol, or about 1,200,000 g/mol. In another example, the EPDM-VNB copolymer can have a molecular weight of the highest peak that is less than 80,000 g/mol, less than 60,000 g/mol, or less than 50,000 g/mol. In another example, the EPDM-diene copolymer can have a molecular weight of the highest peak from about 8,000 g/mol to about 250,000 g/mol, about 30,000 g/mol to about 1,200,000 g/mol, about 20,000 g/mol to about 80,000 g/mol, about 40,000 g/mol to about 80,000 g/mol, about 100,000 g/mol to about 750,000 g/mol, about 480,000 g/mol to about 1,100,000 g/mol, about 500,000 g/mol to about 1,000,000 g/mol.

The EPDM-diene copolymer can have a polydispersity index (PDI) and/or molecular weight distribution ($M_w/M_n$) from a low of about 2.1, about 4.0, or about 5.0, to a high of about 6.0, about 7.0, or about 28. For example, the EPDM-diene copolymer can have a polydispersity index and/or molecular weight distribution from about 2.1 to about 8.6, about 3.0 to about 9.0, about 2.9 to about 7.8, about 5.0 to about 6.0, about 5.9 to about 6.2, or about 4.0 to about 7.0, about 12.3 to about 22.5, or about 2.3 to about 24.5.

The EPDM-diene copolymer can have a content of the one or more ethylenes that can vary widely. For example, the EPDM-diene copolymer can have an ethylene content from a low of about 0 wt %, about 5 wt %, or about 30 wt %, to a high of about 70 wt %, about 80 wt %, or about 95 wt %.

In another example, the EPDM-diene copolymer can have an ethylene content of at least 45 wt %, at least 50 wt %, or at least 55 wt %. In another example, the EPDM-diene copolymer can have an ethylene content of the vinyl norbornene polymers from about 5 wt % to about 95 wt %, about 25 wt % to about 75 wt %, about 20 wt % to about 80 wt %, about 69 wt % to about 75 wt %, about 68 wt % to about 82 wt %, about 72 wt % to about 86 wt %, about 50 wt % to about 73 wt %, about 33 wt % to about 48 wt %, about 60 wt % to about 70 wt %, about 71 wt % to about 81 wt %, about 20 wt % to 30 wt %, about 50 wt % to about 60 wt %, or about 70 wt % to about 80 wt %. The weight percent of the ethylene in the EPDM-diene copolymer copolymer can be based on the total weight of the EPDM-diene copolymer; or based on the total weight of the one or more ethylenes, the one or more propylenes, one or more dienes, and one or more additives.

The EPDM-diene copolymer can have a content of the one or more propylenes that can vary widely. For example, the EPDM-diene copolymer can have a propylene content from a low of about 0 wt %, about 5 wt %, or about 30 wt %, to a high of about 70 wt %, about 80 wt %, or about 95 wt %. In another example, the EPDM-diene copolymer can have a propylene content of the vinyl norbornene polymers from about 5 wt % to about 95 wt %, about 25 wt % to about 75 wt %, about 20 wt % to about 80 wt %, about 69 wt % to about 75 wt %, about 68 wt % to about 82 wt %, about 72 wt % to about 86 wt %, about 50 wt % to about 73 wt %, about 33 wt % to about 48 wt %, about 60 wt % to about 70 wt %, about 71 wt % to about 81 wt %, about 20 wt % to 30 wt %, about 50 wt % to about 60 wt %, or about 70 wt % to about 80 wt %. The weight percent of the propylene in the EPDM-diene copolymer can be based on the total weight of the EPDM-diene copolymer; or based on the total weight of the one or more ethylenes, the one or more propylenes, the one or more dienes, and one or more additives.

The EPDM-diene copolymer can have a content of the one or more vinyl norbornene that can vary widely. For example, the EPDM-diene copolymer can have a vinyl norbornene content from a low of about 0 wt %, about 5 wt %, or about 30 wt %, to a high of about 70 wt %, about 80 wt %, or about 95 wt %. In another example, the EPDM-diene copolymer can have a vinyl norbornene content of at least 2 wt %, at least 3 wt %, or at least 8 wt %. In another example, the EPDM-diene copolymer can have a vinyl norbornene content from about 5 wt % to about 95 wt %, about 25 wt % to about 75 wt %, about 20 wt % to about 80 wt %, about 69 wt % to about 75 wt %, about 68 wt % to about 82 wt %, about 72 wt % to about 86 wt %, about 50 wt % to about 73 wt %, about 33 wt % to about 48 wt %, about 60 wt % to about 70 wt %, about 71 wt % to about 81 wt %, about 20 wt % to 30 wt %, about 50 wt % to about 60 wt %, or about 70 wt % to about 80 wt %. The weight percent of the vinyl norbornene in the EPDM-diene copolymer can be based on the total weight of the EPDM-diene copolymer; or based on the total weight of the one or more ethylenes, the one or more propylenes, one or more dienes, and one or more additives.

The EPDM-diene copolymer can have an ethylene:propylene (E:P) ratio that varies widely. For example, the EPDM-diene copolymer can have an ethylene/propylene ratio can be 10:90, 20:80, 30:70, 40:60, 50:50; 60:40, 63:37, 70:30, 80:20, and 90:10. In another example, the EPDM-VNB copolymer can have an ethylene/propylene ratio between 40:60 and 80:20, 30:70 and 40:60, or 30:70 and 50:50.

The EPDM-diene copolymer can have a viscosity that varies widely. For example, the EPDM-diene copolymer can have a viscosity from a low of about 1 cP, about 1,000 cP, or about 100,000 cP, to a high of about 250,000 cP, about 900,000 cP, or about 2,500,000 cP. In another example, the EPDM-diene copolymer copolymer can have a viscosity from about 1 cP to about 2,500,000 cP, about 100 cP to about 2,000,000 cP, about 100 cP to about 10,000 cP, about 10,000 cP to about 100,000 cP, about 1,000 cP to about 250,000 cP, about 10,000 cP to about 50,000 cP, about 100,000 cP to about 250,000 cP, about 620,000 cP to about 850,000 cP, about 700,000 cP to about 750,000 cP, about 700,000 cP to about 800,000 cP, about 650,000 cP to about 855,000 cP, about 700,000 cP to about 800,000 cP, about 500,000 cP to about 1,000,000 cP, or about 500,000 cP to about 2,500,000 cP. The viscosity of the EPDM-diene copolymer can be measured on a Brookfield viscosimeter. The viscosity of the EPDM-diene copolymer can be measured at various temperatures, such as 25° C., 40° C., 60° C., and 100° C.

The EPDM-diene copolymer can have a solids content that varies widely. For example, the EPDM-diene copolymer can have a solids content from a low of about 1 wt %, about 10 wt %, or about 30 wt %, to a high of about 70 wt %, about 80 wt %, or about 95 wt %. In another example, the EPDM-diene copolymer can have a solids content greater than about 50 wt %, about 55 wt %, or about 70 wt %. In another example, the EPDM-diene copolymer can have a solids content from about 1 wt % to about 95 wt %, about 5 wt % to about 12 wt %, about 7 wt % to about 20 wt %, about 45 wt % to about 55 wt %, about 47 wt % to about 54 wt %, about 30 wt % to about 54 wt %, about 33 wt % to about 48 wt %, about 51 wt % to about 54 wt %, or about 50 wt % to about 60 wt %. The weight percent of the solids content of EPDM-diene copolymer can be based on the total weight of the EPDM-diene copolymer; or based on the total weight of the one or more ethylenes, the one or more propylenes, one or more dienes, and one or more additives.

The EPDM-diene copolymer can have a glass transition temperature ($T_g$) that varies widely. For example, the EPDM-diene copolymer can have a glass transition temperature from a low of about −60° C., about −50° C., or about −40° C., to a high of about −10° C., about −5° C., or about 0° C. In another example, the EPDM-diene copolymer can have a glass transition temperature from about −60° C. to about 0° C., about −55° C. to about −45° C., about −45° C. to about −35° C., or −26° C. to about −1° C.

The one or more solvents for the first reaction mixture, second reaction mixture, and catalyst mixture can include, but is not limited to: aliphatic hydrocarbons, such as hexanes; aromatic hydrocarbons, such as toluene and benzene; water; deionized water; methanol; ethanol; propanol; isopropanol; acetone; acetonitrile; chloroform; diethyl ether; methylene chloride; dimethyl formamide; ethylene glycol; propylene glycol; triethylamine; tetrahydrofuran; and mixtures thereof. In some embodiments, the solvent can provide a carrier for the ethylene, propylene, vinyl norbornene, catalyst, cocatalyst, and/or catalyst reactivator with a flow rate to a reactor.

The one or more ethylenes can include, but is not limited to: an ethylene monomer, ethylene polymer, and mixtures thereof. The ethylene can be provided in various forms. For example, the ethylene can be provided as a solution of the ethylene and a solvent.

The one or more propylenes can include, but is not limited to: a propylene monomer, propylene polymer, and mixtures thereof. The propylene can be provided in various forms. For example, the propylene can be provided as a solution of propylene and a solvent.

The one or more vinyl norbornenes can include, but is not limited to: a vinyl norbornene monomers, vinyl norbornene polymers, and mixtures thereof. The vinyl norbornene can be provided in various forms. For example, the vinyl norbornene can be provided as a solution of the vinyl norbornene and a solvent.

The one or more hydrogens can include, but is not limited to: hydrogen, diatomic hydrogen, hydrogen gas, and mixtures thereof. The hydrogen can be provided in various forms. For example, the hydrogen can be provided as a gas with a flow rate to a reactor.

The one or more catalysts can include, but is not limited to: a first catalyst, a second catalyst, a third catalyst, and more catalysts. The one or more catalysts can include, but is not limited to: a Ziegler-Natta catalyst, vanadium oxytrichloride ($VOCl_3$), metallocene bis(indenyl) zirconium dichloride, ethylene bis(indenyl) zirconium dichloride (Eurecene 5036), and methylphenylbis(cyclopentadienyl) zirconium dichloride, other metallocenes, and mixtures thereof. The catalyst can be provided in various forms. For example, the catalyst can be provided as a solution of the catalyst and a solvent. In some embodiments, the catalyst selection can assist with forming different ethylene:propylene ratios and VNB content in the EPDM-diene copolymer. For example, the metallocene can be used in lower molecular weight EPDM-diene copolymer formation with a flow rate to a reactor.

The one or more cocatalysts can include, but is not limited to: a first cocatalyst, a second cocatalyst, a third cocatalyst, and more cocatalysts. The one or more cocatalysts can include, but is not limited to: triisobutyl aluminum (TIBA); N,N-dimethylanilinium tetrakis(pentafluorophenyl) borate; ethyl aluminum sesqui chloride; methylaluminoxane (MAO); and mixtures thereof. The cocatalyst can be provided in various forms. For example, the cocatalyst can be provided as a solution of cocatalyst and a solvent with a flow rate to a reactor.

The one or more catalyst reactivators can include, but is not limited to: a first catalyst reactivator, a second catalyst reactivator, a third catalyst reactivator, and more catalyst reactivators. The one or more catalyst reactivators can include, but is not limited to: monochlorophenylacetic acid ethyl ester (MCPAE), dichlorophenylacetic acid ethyl ester (DCPAE), and mixtures thereof. The catalyst can be provided in various forms. For example, the catalyst reactivators can be provided as a solution of the catalyst reactivators and a solvent with a flow rate to a reactor.

The one or more additives can include, but is not limited to: one or more catalysts, one or more cocatalysts, one or more catalyst reactivators, one or more curing agents, one or more crosslinking compounds, one or more oils, one or more paraffinic oils, one or more acids, one or more bases, one or more buffers, one or more wetting agents, one or more surfactants, one or more pigments, one or more opacifying agents, one or more anti-foam agents, one or more antioxidants, one or more stabilizers, one or more tackifier agents, water, and mixtures thereof. The additive can be provided in various forms. For example, the additive can be provided as a solution of the additive and a solvent with a flow rate to a reactor.

The one or more additives can include commercially available additives. For example, the additives can include, but is not limited to: OMNIRAD® 819, a bis(2,4,6-trimethylbenzoyl)phenylphospine oxide, CAS No. 162881-26-7, made by IGM RESINS®; OMNIPOL® ASA, which is a poly(ethylene glycol) bis(P-dimethylaminobenzoate), CAS No. 71512-90-8, IGM RESINS®; COUPSIL® 6508, a precipitated silica, surface-modified with organosilane, made by Evonik operations GMBH; SARTOMER® SR-350 coagent, a trimethylolpropane trimethacrylate, CAS No. 3290-92-4, made by ARKEMA®; SUNPAR® 150 Oil, a paraffinic process oil made by R. E. Carroll, Inc.; NAUGARD® 445 Antioxidant, a 4,4'-Bis($\alpha,\alpha$-dimethylbenzyl)diphenylamine made by AKROCHEM.

The one or more curing agents can include, but is not limited to: one or more peroxides, one or more amines, one or more sulfur compounds, one or more organosiloxanes, 2,2'-(4-methylphenylimino)diethanol, and mixtures thereof. In some embodiments, the EPDM-diene copolymer can be cured with ultraviolet (UV) light. The one or more crosslinking compounds, but is not limited to: one or more peroxide compounds, one or more sulfur compounds, one or more platinum catalysts, ultraviolet light, and mixtures thereof. The peroxide compound can include, but is not limited to: phenylbis(2,4,6-trimethylbenzoyl) phosphineoxide (BAPO). The peroxide compound can include commercially available additives. For example, the commercially available peroxide can include, but is not limited to, DiCup 40KE Peroxide, a dicumyl peroxide in a clay carrier by HARWICK STANDARD®.

The one or more tackifier agents can include, but is not limited to, a rosin ester, a hydrocarbon, rosin acid, terpene, modified terpene, coumarone-indene, or mixtures thereof. The tackifier agent can include commercially available tackifier agents. For example, the tackifier agent can include, but is not limited to, TACOLYN® 3400 and TACOLYN® 1070 by Hercules, Inc.

The EPDM-diene copolymer can have a content of the one or more additives that can vary widely. For example, the EPDM-diene copolymer can have a content of the one or more additives from a low of about 0.1 wt %, about 0.5 wt %, or about 1 wt %, to a high of about 50 wt %, about 70 wt %, or about 90 wt %. In another example, the EPDM-diene copolymer can have content of the one or more additives from about 0.1 wt % to about 90 wt %, 0 wt % to about 10 wt %, 0.5 wt % to about 10 wt %, about 2 wt % to about 20 wt %, about 5 wt % to about 60 wt %, about 15 wt % to about 25 wt %, about 17 wt % to about 54 wt %, about 19 wt % to about 27 wt %, about 15 wt % to about 27 wt %, about 14 wt % to about 24 wt %, about 11 wt % to about 28 wt %, about 33 wt % to about 48 wt %, about 51 wt % to about 54 wt %, or about 50 wt % to about 60 wt %. The weight percent of the based on the total weight of the EPDM-diene copolymer, or based on the total weight of the one or more ethylenes, the one or more propylenes, one or more dienes, and one or more additives.

The EPDM-diene copolymer can have a water content that varies widely. For example, the EPDM-diene copolymer can have a water content from a low of about 0 wt %, about 0.5 wt %, or about 1 wt %, to a high of about 50 wt %, about 70 wt %, or about 90 wt %. In another example, the EPDM-VNB copolymer can have a water content of less than 5 wt %, less than 2 wt %, or less than 1 wt %. In another example, the EPDM-diene copolymer can have a water content from about 0 wt % to about 90 wt %, 0.1 wt % to about 10 wt %, 0.5 wt % to about 10 wt %, about 2 wt % to about 20 wt %, about 5 wt % to about 60 wt %, about 15 wt % to about 25 wt %, about 17 wt % to about 54 wt %, about 30 wt % to about 54 wt %, about 33 wt % to about 48 wt %, about 51 wt % to about 54 wt %, or about 50 wt % to about 60 wt %. In another example, the EPDM-diene copolymer can be free of water. The weight percent of the water in the EPDM-diene copolymer can be based on the total weight of the EPDM-diene copolymer, or based on the total weight of the one or more ethylenes, one or more propylenes, one or more dienes monomers, and one or more additives.

In one or more embodiments, the method of making EPDM-diene copolymers can include, but is not limited to: adding a solvent to a reactor; adding a propylene and a catalyst mixture to the solvent in the reactor to make a first reaction mixture; contacting an ethylene to the first reaction mixture to make a second reaction mixture; and contacting a vinyl norbornene to the second reaction mixture to make a copolymer. In some embodiments, the method of making EPDM-diene copolymers can include, but is not limited to: one or more reaction vessels, one or more short stops, one or more flash tanks, one or more wash mixers, one or more wash tanks, one or more wiped-film evaporator. In some embodiments, the method can reduce and/or inhibit premature cross-linking in the reactor. In another embodiment, the EPDM-diene copolymer can substantially cross-link on final formulation. In one or more embodiments, the EPDM-diene copolymer can be functionalized with various functional groups so they can undergo further chemical reactions. For example, the EPDM-diene copolymer can undergo hydrosilylation with a platinum catalyst. In another example, the EPDM-diene copolymer can undergo hydrosilylation with a Speier's catalyst, such as $H_2[PtCl_6]$, or a Karstedt's catalyst, such as $[Pt_2(dvtms)_3]$, where dvtms is 1,3-divinyl-1,1,3,3-tetramethyldisiloxane).

In some embodiments, the method of making EPDM-diene copolymers can include, but is not limited to: starting solvent flow to a reactor; agitating reactor contents; increasing pressure in the reactor; increasing the temperature of the contents in the reactor; adding a cocatalyst to the reactor; adding propylene to the reactor; adding hydrogen to the reactor; adding ethylene to the reactor; reducing flowrate of propylene; adding a catalyst mixture to reactor; adjusting ethylene and propylene flow to reactor; measuring reactor contents for percent solids; when percent solids are greater than 3.0, add vinyl norbornene; analyzing the polymer by taking a sample from the reactor and testing for nonconjugated diene weight percent and ethylene:propylene ratio; and continuing to adjust the nonconjugated diene solution flow rate until the desired nonconjugated diene composition is achieved. In some embodiments, the reaction can include, but is not limited to: a polymerization reaction.

In some embodiments, the method of making EPDM-diene copolymer can include a preparation of a catalyst mixture. The catalyst mixture can include, but is not limited to: one or more catalyst, one or more cocatalysts, one or more catalyst reactivators, and one or more solvents. In some embodiments, the catalyst mixture can be prepared by diluting 211 grams (1.1 moles) of co-catalyst number 2 in 830 grams of toluene at 35° C. To this diluted solution add 3.04 grams (3.78 mmoles) of co-catalyst number 1 and stir to give a clear homogeneous solution. Add 1.5 grams (3.82 mmoles) of metallocene complex to the co-catalyst mixture and stir to give a clear yellow to amber homogeneous solution having a metallocene complex concentration of 0.001435 grams of metallocene per gram of solution.

In some embodiments, the method of making EPDM-diene copolymers can include a one-pot synthesis or a multi-batch synthesis. For example, the method of making EPDM-diene copolymers can include a first reactor, second reactor, third reactor, fourth reactor, and more reactors. In another example, method of making EPDM-diene copolymers can include reactors in a series or reactors in parallel.

FIG. 1 shows a method for making the EPDM-diene copolymers. In some embodiments, a second reactor run in a series, as shown in FIG. 1. The reaction flowchart employs a solvent that serves as a reaction medium and monomer carrier. The solvent can be charged to a reactor to bring it to an operating pressure of about 190 psig to about 250 psig. The solvent can be stirred in the reactor at 700 to 1,500 rpm. Then, hydrogen and excess propylene can be introduced to the reactor via the solvent supply stream. The reactor can be brought to an operating temperature and the catalyst reactivator, co-catalyst, and catalyst can be introduced to the reactor by separate supply streams. Once the system is stable, ethylene can be introduced in increments via the solvent stream to initiate polymerization, resulting in production of an EPDM copolymers. Once the EPDM-diene copolymers reaches a desired ethylene:propylene ratio, the nonconjugated diene can be introduced at a flow rate to make an EPDM-diene copolymer of a desired ethylene:propylene:diene ratio. The reagent flows can be adjusted, to give a reactor residence time, such as about 30 minutes; after which, the polymer/hexanes solution can be removed from the reactor and washed to remove any catalyst mixture residue. The washed EPDM-diene copolymers can then be introduced to a wiped-film evaporator, which removes the solvent from the low molecular weight liquid EPDM-diene copolymer product. In some embodiments, a rotary evaporator can be used. In another embodiment, a second reactor can be connected in a series, as shown in FIG. 1.

The addition of solvent, such as hexanes, to the reactor can have a flow rate that varies widely. For example, the addition of solvent to the reactor can have a flow from a low of about 1.0 gram/minute, about 2.0 grams/minute, or about 5.0 grams/minute, to a high of about 60.0 grams/minute, about 80.0 grams/minute, or about 100.0 grams/minute. In another example, the addition of solvent to the reactor can have a flow from about 1.0 grams/minute to about 99.0 grams/minute, about 2.5 grams/minute to about 3.0 grams/minute, about 3.0 grams/minute to about 3.5 grams/minute, about 3.5 grams/minute to about 4.0 grams/minute, about 4.0 grams/minute to about 20.0 grams/minute, about 5.0 grams/minute to about 6.0 grams/minute, about 6.0 grams/minute to about 9.0 grams/minute, about 8.0 grams/minute to about 12.0 grams/minute, about 20.0 grams/minute to about 40.0 grams/minute, about 25.0 grams/minute to about 65.0 grams/minute, about 45.0 grams/minute to about 50.0 grams/minute, or about 45.0 grams/minute to about 55.0 grams/minute. In some embodiments, the addition of the ethylene, propylene, vinyl norbornene, catalyst, cocatalyst, catalyst reactivator, and/or additives to the first reaction mixture or second reaction mixture can be added with the solvent.

The addition of ethylene to the reactor can have a flow rate that varies widely. For example, the addition of ethylene to the reactor can have a flow from a low of about 1.0 gram/minute, about 2.0 grams/minute, or about 5.0 grams/minute, to a high of about 60.0 grams/minute, about 80.0 grams/minute, or about 100.0 grams/minute. In another example, the addition of ethylene to the reactor can have a flow from about 1.0 grams/minute to about 99.0 grams/minute, about 2.5 grams/minute to about 3.0 grams/minute, about 3.0 grams/minute to about 3.5 grams/minute, about 3.5 grams/minute to about 4.0 grams/minute, about 4.0 grams/minute to about 20.0 grams/minute, about 5.0 grams/minute to about 6.0 grams/minute, about 6.0 grams/minute to about 9.0 grams/minute, about 8.0 grams/minute to about 12.0 grams/minute, about 20.0 grams/minute to about 40.0 grams/minute, about 25.0 grams/minute to about 65.0 grams/minute, about 45.0 grams/minute to about 50.0 grams/minute, or about 45.0 grams/minute to about 55.0 grams/minute. In some embodiments, the ethylene flow rate can be adjusted to obtain the desired ethylene:propylene ratio in the EPDM-diene copolymer.

The addition of propylene to the reactor can have a flow rate that varies widely. For example, the addition of hexanes to the reactor can have a flow from a low of about 1.0 gram/minute, about 2.0 grams/minute, or about 5.0 grams/minute, to a high of about 60.0 grams/minute, about 80.0 grams/minute, or about 150.0 grams/minute. In another example, the addition of propylene to the reactor can have a flow from about 1.0 grams/minute to about 150.0 grams/minute, about 1.0 grams/minute to about 100.0 grams/minute, about 2.5 grams/minute to about 3.0 grams/minute, about 3.0 grams/minute to about 3.5 grams/minute, about 3.5 grams/minute to about 4.0 grams/minute, about 4.0 grams/minute to about 20.0 grams/minute, about 5.0 grams/minute to about 6.0 grams/minute, about 6.0 grams/minute to about 9.0 grams/minute, about 8.0 grams/minute to about 12.0 grams/minute, about 20.0 grams/minute to about 40.0 grams/minute, about 25.0 grams/minute to about 65.0 grams/minute, about 45.0 grams/minute to about 50.0 grams/minute, or about 45.0 grams/minute to about 55.0 grams/minute. In some embodiments, the propylene flow rate can be adjusted to obtain the desired ethylene:propylene ratio in the EPDM-diene copolymer.

The addition of the catalyst to the reactor can have a flow rate that varies widely. For example, the addition of catalyst to the reactor can have a flow from a low of about 1.0 gram/minute, about 2.0 grams/minute, or about 5.0 grams/minute, to a high of about 60.0 grams/minute, about 80.0 grams/minute, or about 100.0 grams/minute. In another example, the addition of catalyst to the reactor can have a flow from about 1.0 gram/minute to about 99.0 grams/minute, about 2.5 grams/minute to about 3.0 grams/minute, about 3.0 grams/minute to about 3.5 grams/minute, about 3.5 grams/minute to about 4.0 grams/minute, about 4.0 grams/minute to about 20.0 grams/minute, about 5.0 grams/minute to about 6.0 grams/minute, about 6.0 grams/minute to about 9.0 grams/minute, about 8.0 grams/minute to about 12.0 grams/minute, about 20.0 grams/minute to about 40.0 grams/minute, about 25.0 grams/minute to about 65.0 grams/minute, about 45.0 grams/minute to about 50.0 grams/minute, or about 45.0 grams/minute to about 55.0 grams/minute.

The addition of the cocatalyst to the reactor can have a flow rate that varies widely. For example, the addition of catalyst to the reactor can have a flow from a low of about 1.0 gram/minute, about 2.0 grams/minute, or about 5.0 grams/minute, to a high of about 60.0 grams/minute, about 80.0 grams/minute, or 100.0 about grams/minute. In another example, the addition of cocatalyst to the reactor can have a flow from about 1.0 gram/minute to about 99.0 grams/minute, about 2.5 grams/minute to about 3.0 grams/minute, about 3.0 grams/minute to about 3.5 grams/minute, about 3.5 grams/minute to about 4.0 grams/minute, about 4.0 grams/minute to about 20.0 grams/minute, about 5.0 grams/minute to about 6.0 grams/minute, about 6.0 grams/minute to about 9.0 grams/minute, about 8.0 grams/minute to about 12.0 grams/minute, about 20.0 grams/minute to about 40.0 grams/minute, about 25.0 grams/minute to about 65.0 grams/minute, about 45.0 grams/minute to about 50.0 grams/minute, or about 45.0 grams/minute to about 55.0 grams/minute.

The addition of the catalyst reactivator to the reactor can have a flow rate that varies widely. For example, the addition of catalyst reactivator to the reactor can have a flow from a low of about 1.0 gram/minute, about 2.0 grams/minute, or about 5.0 grams/minute, to a high of about 60.0 grams/minute, about 80.0 grams/minute, or 100.0 about grams/minute. In another example, the addition of catalyst reactivator to the reactor can have a flow from about 1.0 gram/minute to about 99.0 grams/minute, about 2.5 grams/minute to about 3.0 grams/minute, about 3.0 grams/minute to about 3.5 grams/minute, about 3.5 grams/minute to about 4.0 grams/minute, about 4.0 grams/minute to about 20.0 grams/minute, about 5.0 grams/minute to about 6.0 grams/minute, about 6.0 grams/minute to about 9.0 grams/minute, about 8.0 grams/minute to about 12.0 grams/minute, about 20.0 grams/minute to about 40.0 grams/minute, about 25.0 grams/minute to about 65.0 grams/minute, about 45.0 grams/minute to about 50.0 grams/minute, or about 45.0 grams/minute to about 55.0 grams/minute.

The addition of hydrogen to the reactor can have a flow rate that varies widely. For example, the addition of hydrogen to the reactor can have a flow from a low of about 1.0 standard liters per hour (SLPH), about 2.0 SLPH, or about SLPH, to a high of about 60.0 SLPH, about 80.0 SLPH, or about 150.0 SLPH. In another example, the addition of hydrogen to the reactor can have a flow from about 1.0 SLPH to about 150.0 SLPH, about 2.5 SLPH to about 3.0 SLPH, about 3.0 SLPH to about 3.5 SLPH, about 3.5 SLPH to about 4.0 SLPH, about 4.0 SLPH to about 20.0 SLPH, about 5.0 SLPH to about 6.0 SLPH, about 6.0 SLPH to about 9.0 SLPH, about 8.0 SLPH to about 12.0 SLPH, about 20.0 SLPH to about 40.0 SLPH, about 25.0 SLPH to about 65.0 SLPH, about 45.0 SLPH to about 50.0 SLPH, or about 45.0 SLPH to about 55.0 SLPH. In another example, the addition of hydrogen to the reactor can have a flow from a low of about 1.0 gram/minute, about 2.0 grams/minute, or 150 about grams/minute, to a high of about 60.0 grams/minute, about 80.0 grams/minute, or about 100.0 grams/minute. In another example, the addition of hydrogen to the reactor can have a flow from about 1.0 gram/minute to about 99.0 grams/minute, about 2.5 grams/minute to about 3.0 grams/minute, about 3.0 grams/minute to about 3.5 grams/minute, about 3.5 grams/minute to about 4.0 grams/minute, about 4.0 grams/minute to about 20.0 grams/minute, about 5.0 grams/minute to about 6.0 grams/minute, about 6.0 grams/minute to about 9.0 grams/minute, about 8.0 grams/minute to about 12.0 grams/minute, about 20.0 grams/minute to about 40.0 grams/minute, about 25.0 grams/minute to about 65.0 grams/minute, about 45.0 grams/minute to about 50.0 grams/minute, or about 45.0 grams/minute to about 55.0 grams/minute.

The first reaction mixture, second reaction mixture, and/or catalyst mixture can be reacted and/or stirred in an open container or a closed container. The first reaction mixture, second reaction mixture, and catalyst mixture can be reacted and/or stirred under a vacuum. The first reaction mixture, second reaction mixture, and/or catalyst mixture can be reacted and/or stirred under an inert atmosphere, such as He, Ne, $N_2$, and Ar.

In some embodiments, the first reaction mixture, second reaction mixture, and/or catalyst mixture can be reacted and/or stirred under a widely varying gauge pressure. For example, the first reaction mixture, second reaction mixture, and catalyst mixture can be reacted and/or stirred under a gauge pressure from a low of about 0.1 psig, about 1 psig, or about 5 psig, to a high of about 50 psig, about 90 psig, or about 300 psig. In another example, first reaction mixture and second reaction mixture can be reacted and/or stirred under a gauge pressure from about 30 psig to about 85 psig, about 0.1 psig to about 90 psig, about 0.1 psig to about 1 psig, about 1 psig to about 85 psig, about 20 psig to about 90 psig, about 5 psig to about 20 psig, about 25 psig to about 75 psig, about 50 psig to about 175 psig, about 55 psig to about 235 psig, or about 0.1 psig to about 300 psig.

The first reaction mixture, second reaction mixture, and/or catalyst mixture can be agitated and/or stirred. For example, first reaction mixture, second reaction mixture, and catalyst mixture can be stirred from about 50 revolution per minute (rpm) to about 1,500 rpm, about 50 rpm to about 500 rpm, or about 60 rpm to about 1,000 rpm.

The first reaction mixture, second reaction mixture, and/or catalyst mixture can have a viscosity that can vary widely. For example, the first reaction mixture, second reaction mixture, and/or catalyst mixture can have a viscosity from a low of about 100 cP, about 1,000 cP, or about 100,000 cP, to a high of about 250,000 cP, about 900,000 cP, or about 2,500,000 cP. In another example, the first reaction mixture and second reaction mixture can have a viscosity from about 100 cP to about 2,500,000 cP, about 1,000 cP to about 250,000 cP, about 2,500 cP to about 250,000 cP, about 2,500 cP to about 2,500,000 cP, about 10,000 cP to about 100,000 cP, about 10,000 cP to about 50,000 cP, about 100,000 cP to about 250,000 cP, about 620,000 cP to about 850,000 cP, about 700,000 cP to about 750,000 cP, about 700,000 cP to about 800,000 cP, about 650,000 cP to about 855,000 cP, about 700,000 cP to about 800,000 cP, about 500,000 cP to about 1,000,000 cP, or about 500,000 cP to about 2,500,000 cP. The viscosity of the first reaction mixture, second reaction mixture, and/or catalyst mixture can be measured on a Brookfield viscosimeter. The viscosity of the first reaction mixture, second reaction mixture, and/or catalyst mixture can be measured at various temperatures, such as 25° C., 40° C., 60° C., and 100° C.

The pH of the first reaction mixture, second reaction mixture, and/or catalyst mixture can vary widely. For example, first reaction mixture and second reaction mixture can have a pH from about 4.0 to about 12.0, about 5.0 to about 10.0, about 7.5 to about 11.0, about 7.0 to about 10.0, about 8.0 to about 9.0, about 9.0 to about 10.0, about 8.0 to about 10.0, about 9.0 to about 11.0, or about 6.0 to about 9.0.

The first reaction mixture, second reaction mixture, and/or catalyst mixture can be heated to a temperature from a low of about 0° C., about 15° C., and about 25° C., to a high of about 35° C., about 65° C., and about 200° C. For example, the first reaction mixture, second reaction mixture, and/or catalyst mixture can be heated to a temperature from about 25° C. to about 28° C., about 25° C. to about 35° C., about 25° C. to about 90° C., about 30° C. to about 45° C., about 40° C. to about 90° C., about 43° C. to about 78° C., about 40° C. to about 90° C., about 100° C. to about 200° C. In another example, the first reaction mixture, second reaction mixture, and/or catalyst mixture can be at room temperature. In another example, the reaction occurs at a temperature of greater than about 40° C. or greater than about 50° C. The first reaction mixture, second reaction mixture, and/or catalyst mixture can be performed at different temperatures.

The first reaction mixture can be reacted and/or stirred for a first reaction time from a short of about 15 s, about 120 s, or about 300 s, to a long of about 1 h, about 24 h, or about 72 h. For example, the first reaction time can be from about 1 min to about 15 min, about 5 min to about 45 min, about 1 h to about 7 h, about 1 h to about 12 h, about 5 h to about 15 h, about 10 h to about 24 h, about 12 h to about 17 h, about 12 h to about 24 h, about 22 h to about 50 h, or about 24 h to about 72 h.

The second reaction mixture can be reacted and/or stirred for a second reaction time from a short of about 15 s, about 120 s, or about 300 s, to a long of about 1 h, about 24 h, or about 72 h. For example, the second reaction time can be from about 1 min to about 15 min, about 5 min to about 45 min, about 1 h to about 7 h, about 5 h to about 15 h, about 10 h to about 24 h, about 12 h to about 17 h, about 12 h to about 24 h, about 22 h to about 50 h, or about 24 h to about 72 h.

The catalyst mixture can be reacted and/or stirred for a second reaction time from a short of about 15 s, about 120 s, or about 300 s, to a long of about 1 h, about 24 h, or about 72 h. For example, the catalyst mixture time can be from about 1 min to about 15 min, about 5 min to about 45 min, about 1 h to about 7 h, about 1 h to about 12 h, about 5 h to about 15 h, about 10 h to about 24 h, about 12 h to about 17 h, about 12 h to about 24 h, about 22 h to about 50 h, or about 24 h to about 72 h.

In one or more embodiments, the EPDM-diene copolymer can be mixture of one or more EPDM-diene copolymers. For example, the EPDM-diene copolymer can be mixture of two EPDM-diene copolymers, three EPDM-diene copolymers, four EPDM-diene copolymers, or more EPDM-diene copolymers. In another example, the EPDM-diene copolymer can a mixture of a low molecular weight EPDM-diene copolymers and a high molecular weight EPDM-diene copolymer. In another example, the EPDM-diene copolymer can be a mixture of a first EPDM-diene copolymer and a second EPDM-diene copolymer in a weight ratio that varies widely. For example, the EPDM-diene copolymer can have two EPDM-diene copolymers in a weight ratio of about 10:90, about 20:80, about 30:70, about 40:60, about 45:55, about 50:50, about 55:45, about 60:40, about 70:30, about 80:20, or about 90:10.

In one or more embodiments, the EPDM-diene copolymers can be used in a wide variety of commercial products. For example, the EPDM-diene copolymers can be used in coatings, roof coatings, adhesives, liquid injection molding (LIM), additive manufacturing (3D Printing), binders for heat conducting/dissipating electronic materials, lubes, gear oils, greases, caulks, oil additives, high hardness compounds, reactive plasticizers, and polymer modification applications.

EXAMPLES

To provide a better understanding of the foregoing discussion, the following non-limiting examples are offered. Although the examples can be directed to specific embodiments, they are not to be viewed as limiting the invention in any specific respect.

A continuous production of liquid EPDM-VNB copolymers using a Ziegler-Natta catalyst were performed to show the varying the ethylene:propylene ratios and vinyl norbornene content in the EPDM-VNB copolymers while keeping the polymer in liquid form with low molecular weight. The continuous production of liquid EPDM-VNB copolymers using Ziegler-Natta catalysts are shown in Examples 1-10.

The reagents for continuous production of liquid EPDM-VNB copolymers using a Ziegler-Natta catalyst were: ethyl aluminum sesqui chloride (EASC), co-catalyst; vanadium oxytrichloride ($VOCl_3$), catalyst; dichlorophenylacetic acid ethyl ester (DCPAE), catalyst reactivator; hexane (reaction medium); the monomers ethylene, propylene, vinyl norbornene solution in hexane; and hydrogen.

The Ziegler-Natta catalyst mixture was prepared by the following: EASC solution prepared by diluting with dry hexane to give a solution having concentration equal to 0.105 grams/gram of solution; $VOCl_3$ solution prepared by diluting with dry hexane to give a solution having concentration equal to 0.004667 grams/gram of solution; and DCPAE solution prepared by diluting with dry hexane to give a solution having concentration equal to 0.021 grams/gram of solution. The active catalyst is generated in situ when all components are added to the reactor.

The following is the continuous polymerization procedure for the examples using a Ziegler-Natta catalyst: starting solvent (hexane) flow to a 5.6-liter reactor at 100 grams/minute (6000 grams/hour); adjusting agitation to 1000 revolutions per minute (rpm); bringing the reactor pressure to 200 psig; adjusting the reactor temperature to 40° C.; adding EASC solution to the reactor at a flow rate of 150 grams/hour; Start propylene flow to the reactor at 15 g/min. and neat hydrogen at 6.5 Standard Liters Per Hour (SLPH); adding $VOCL_3$ solution to the reactor at 120 g/min; adding DCPAE solution to the reactor at 120 g/min; after a total of 300 grams of propylene has been passed through the reactor starting the ethylene flow at 1.0 g/min; after 5 minutes adjusting ethylene flow to the reactor from 1.0 to 2.5 grams/minute and hold for 3 minutes; after three minutes adjusting ethylene flow to the reactor from 2.5 to 3.0 grams/minute to initiate polymerization (as indicated exothermic reaction in less than 5 minutes); adjusting ethylene flow from 3.0 to 3.5 grams/minute and hold for approximately 10 minutes; adjusting ethylene flow from 3.5 to 4.0 g/min. and increased propylene flow from 15.0 to 20.0 g/min; after 30 minutes, checking reactor contents for percent solids (should be greater than 3.0%); when percent solids are greater than 3.0, adding addition of vinyl norbornene solution at 1.4 grams/minute (84 g/h); gradually increase the VNB solution flow over a one-hour time period until flow is 2.0 grams/minute (120 g/h); after one half hour, analyzing the polymer by taking a sample from the reactor and testing for VNB weight percent and ethylene/propylene ratio; continuing to adjust the vinyl norbornene solution flow rate until the desired vinyl norbornene composition is achieved; taking reactor samples for analyses one-half hour after reaching each desired vinyl norbornene solution flow rate; and adjusting the propylene flow rate to maintain the desired E:P ratio.

Table 1 shows the continuous polymerization reaction parameters using a Ziegler-Natta catalyst to produce liquid EPDM-VNB copolymers. The monomer flow rates are provided specifically for the reaction used in Example 1. The remaining examples varied the flow of monomers to achieve the desired ratios set forth below.

TABLE 1

Polymerization Reaction Conditions for Liquid EPDM-VNB for Example 1

| Reaction Parameter | |
|---|---|
| Reaction Temperature, ° C. | 40.5 |
| Reactor Pressure, psig | 200 |
| Agitation Speed, rpm | 1,000 |
| Reactivator/Catalyst Ratio | 5.0 |
| Cocatalyst Flow, g/h | 15.96 |
| Catalyst Flow, g/h | 0.5694 |
| Cocatalyst/Catalyst Ratio | 28.00 |
| VNB Flow, g/h | 17.46 |
| Ethylene Flow, g/h | 300 |
| Propylene Flow, g/h | 186 |
| Hydrogen Flow, slph | 5.0 |
| Hexane Flow, g/h | 6,000 |
| VNB/Catalyst Ratio | 30.63 |
| Ethylene/Catalyst Ratio | 526 |
| Percent Solids | 6.71 |
| Solvent Flow Rate, g/min | 101 |
| Residence Time, min | 30 |

Tables 2 and 3 show the EPDM-VNB copolymers properties of the ten example reactions conducted according to the reaction parameters set forth in Table 1 and using varying monomer content. For these experiments, samples were taken directly from the reactor to be analyzed without first having to be isolated as a solid polymer. The results show the development of a low molecular weight EPDM-VNB copolymers with high vinyl norbornene content.

TABLE 2

Example Liquid EPDM-VNB Copolymer Properties by Ziegler-Natta Catalyst Continuous Production

| Polymer Properties | Example 1 (Midpoint) | Example 2 | Example 3 | Example 4 (Midpoint) | Example 5 |
|---|---|---|---|---|---|
| C3, Mass % | 35.7 | 25.5 | 48.0 | 36.7 | 47.9 |
| VNB, Mass % | 2.5 | 1.6 | 1.6 | 2.8 | 5.4 |
| Oil Solution Viscosity at 5%, 100° C. (cST) | 8.54 | 7.67 | 8.41 | 8.40 | 11.8 |
| Brookfield Viscosity at 100° C. (cP) | 49,846 | 44,188 | 51,243 | 73,108 | 183,488 |
| $M_w$ (Da) | 18,687 | 16,566 | 19,211 | 27,408 | 68,789 |
| $M_n$ (Da) | 3,682 | 4,218 | 5,199 | 5,982 | 13,473 |
| PDI ($M_w/M_n$) | 5.1 | 3.9 | 3.7 | 4.6 | 5.1 |
| Wt. %, $M_w > 10^6$ (Da) | 0.0 | 0.1 | 0.0 | 0.3 | 0.4 |
| Wt. %, $M_w < 10^5$ (Da) | 96.8 | 98.0 | 98.4 | 95.4 | 84.9 |

TABLE 2-continued

Example Liquid EPDM-VNB Copolymer Properties
by Ziegler-Natta Catalyst Continuous Production

| Polymer Properties | Example 1 (Midpoint) | Example 2 | Example 3 | Example 4 (Midpoint) | Example 5 |
|---|---|---|---|---|---|
| LCB/polymer | 1.47 | 1.34 | 0.53 | 1.36 | 1.77 |
| $T_g$ (° C.) | −60.0 | −49.0 | −64.5 | −57.9 | −54.6 |
| % Crystallinity | 2.9-3.1 | 10.7-13.3 | 0 | 2.6-3.2 | 0 |

TABLE 3

Example Liquid EPDM-VNB Copolymer Properties by
Ziegler-Natta Catalyst Continuous Production (Continued)

| Polymer Properties | Example 6 (crumb) | Example 7 (semi-solid) | Example 8 | Example 9 | Example 10 |
|---|---|---|---|---|---|
| C3, Mass % | 19.5 | 24.6 | 49.8 | 50.4 | 49.2 |
| VNB, Mass % | 6.0 | 5.1 | 6.6 | 8.0 | 10.4 |
| Oil Solution Viscosity at 5%, 100° C. (cST) | 23.62 | 13.60 | 7.81 | 9.99 | 9.78 |
| Brookfield Viscosity at 100° C. (cP) | 666,418 | 2,483,157 | 82,356 | 170,265 | 133,791 |
| $M_w$ (Da) | 249,838 | 930,928 | 30,875 | 63,832 | 50,158 |
| $M_n$ (Da) | 8,604 | 45,879 | 8,382 | 20,795 | 14,479 |
| PDI ($M_w/M_n$) | 29.0 | 20.3 | 3.7 | 3.1 | 3.5 |
| Wt. %, $M_w > 10^6$ (Da) | 8.1 | 13.1 | 0.5 | 0.2 | 0.6 |
| Wt. %, $M_w < 10^5$ (Da) | 72.1 | 51.4 | 95.7 | 85.2 | 89.9 |
| LCB/polymer | 8.12 | 6.42 | 1.61 | 1.03 | 0.72 |
| $T_g$ (° C.) | −33.6 | −43.4 | −54.9 | −48.6 | −47.3 |
| % Crystallinity | 10.3-14.4 | 7.8-12.4 | 0 | 0 | 0 |

The results of the experiments show that it was possible to add VNB to the liquid EPDM polymers above 3.0 wt % while keeping the polymer in a liquid phase. The ability for the vinyl norbornene monomers to incorporate into the polymer chains while keeping the polymer in liquid form has an inverse relationship with the ethylene content in the polymer. Hence, a greater amount of the propylene monomers incorporating into the EPDM polymer chain inhibits the tendency of the vinyl norbornene monomer to form long-chain branches in the polymer chain and increase the molecular weight. Conversely, when ethylene monomers have higher incorporation rate in the EPDM-VNB copolymer, it causes an increase in long-chain branching and the molecular weight of the EPDM-VNB copolymer.

Table 4 shows the vinyl norbornene content of the EPDM-VNB copolymers made by a continuous process using a Ziegler-Natta catalyst at various vinyl norbornene solution flow rates. The propylene flow rates were adjusted to maintain propylene between 49 and 55 in the ethylene:propylene weight ratio.

TABLE 4

Control of the Vinyl Norbornene Content
in the EPDM-VNB Copolymer

| Sample | VNB solution flow grams/hour | VNB wt. % in polymer | Propylene Flow, grams/hour | Propylene in E:P Ratio |
|---|---|---|---|---|
| 1 | 84 | 4.5 | 542 | 51 |
| 2 | 118 | 5.5 | 516 | 51.9 |
| 3 | 136 | 5.8 | 595 | 51.4 |
| 4 | 142 | 6.0 | 581 | 52.0 |
| 5 | 144 | 6.4 | 585 | 51.9 |
| 6 | 152 | 7.4 | 564 | 50.5 |
| 7 | 156 | 8.0 | 553 | 49.4 |

Next, a continuous production of liquid EPDM-VNB copolymers using a metallocene catalyst were performed to show the varying ethylene:propylene ratios and vinyl norbornene content in the EPDM-VNB copolymers while keeping the copolymer in liquid form with low molecular weight. The continuous production of liquid EPDM-VNB copolymers using a metallocene catalyst are shown in Examples 11-15.

The reagents for continuous production of liquid EPDM-VNB copolymers using a metallocene catalyst were: tri-isobutyl aluminum (TIBA) solution in hexane, 0.0238 gram/gram of solution; bis(indenyl) zirconium dichloride (metallocene complex); N,N-dimethylanilinium tetrakis (pentafluorophenyl) borate (co-catalyst number 1); methylaluminoxane (MAO), 30% in toluene (co-catalyst number 2); toluene (catalyst solvent); hexane (reaction medium); the monomers ethylene, propylene, and vinyl norbornene in hexane at 75 wt %; and hydrogen.

The metallocene complex catalyst mixture was prepared by the following: The catalyst was prepared by diluting 211 grams (1.1 moles) of co-catalyst number 2 in 830 grams of toluene at 35° C. To this diluted solution add 3.04 grams (3.78 mmoles) of co-catalyst number 1 and stir to give a clear homogeneous solution. Add 1.5 grams (3.82 mmoles) of metallocene complex to the co-catalyst mixture and stir to give a clear yellow to amber homogeneous solution having a metallocene complex concentration of 0.001435 grams of metallocene per gram of solution.

The following is the continuous polymerization procedure for the examples using a metallocene complex catalyst: starting hexane (solvent) flow to a 5.6-liter reactor at 50 g/minute (3000 g/h); adjusting agitation to 1,000 revolutions per minute (rpm); bringing the reactor pressure to 200 psig; adjusting the reactor temperature to 50° C.; adding tri-isobutyl aluminum (TIBA) to the reactor at a flow rate of 20 g/h, then reduce the flow to 10 g/h (continue at this flow rate for 30 minutes to dry the reactor); starting propylene flow to reactor at 15 g/min and neat hydrogen at 1.5 Standard Liters Per Hour (SLPH); introducing ethylene to the reactor at 1.0 g/min; after a total of 300 grams of propylene was passed through the reactor the flow rate is reduced to 6.0 g/min; starting catalyst mixture flow to reactor with a dose of 50 g of solution, then adjusting catalyst flow rate to 55 g/hr; adjusting ethylene flow to reactor from 1.0 to 2.5 g/min. and hold for 3 mins; after three minutes adjusting ethylene flow to the reactor from 2.5 to 3.0 g/min to initiate polymerization (as indicated exothermic reaction in less than 5 minutes); adjusting ethylene flow from 3.0 to 3.5 g/min. and hold for approximately 10 minutes; adjusting ethylene flow from 3.5 to 4.0 g/min. and increased propylene flow from 6.0 to 9.0 g/min; measuring reactor contents for percent solids (should be greater than 3.0%); when percent solids are greater than 3.0, initiating an addition of VNB solution at 0.83 g/min; gradually increasing the VNB solution flow over a one-hour time period until flow is 2.0 g/minute (120 g/hr); after one half hour, analyzing the polymer by taking a sample from the reactor and testing for VNB weight percent and ethylene: propylene ratio; continuing to adjust the VNB solution flow rate until the desired VNB composition is achieved; analyzing reactor samples at one-half hour after reaching each desired VNB solution flow rate; and adjusting the propylene flow rate will also be required to maintain the desired E:P ratio.

Table 5 shows the continuous polymerization reaction parameters using a metallocene catalyst to produce liquid EPDM-VNB copolymers. The monomer flow rates are provided specifically for the reaction used in Example 11. The remaining examples varied the flow of monomers to achieve the desired ratios set forth below.

TABLE 5

Polymerization Reaction Conditions for Liquid EPDM-VNB for Example 11

| Reaction Parameter | |
|---|---|
| Reaction Temperature, ° C. | 50 |
| Reactor Pressure, psig | 200 |
| Agitation Speed, rpm | 1,000 |
| Cocatalyst 1/Catalyst Ratio | 1.0 |
| Cocatalyst 3 (TIBA) Flow, g/h | 20.0 |
| Catalyst Flow (neat), g/h | 0.0715 |
| Cocatalyst 2 (MAO)/Catalyst Ratio | 288 |
| VNB (solution) Flow, g/h | 120 |
| Ethylene Flow, g/h | 240 |
| Propylene Flow, g/h | 540 |
| Hydrogen Flow, SLPH | 1.5 |
| Hexane Flow, g/h | 3,000 |
| VNB/Catalyst Ratio | 1678 |
| Ethylene/Catalyst Ratio | 3357 |
| Percent Solids | 15.0 |
| Solvent Flow Rate, g/min | 60 |
| Residence Time, min | 30 |

Table 6 shows the EPDM-VNB copolymers and their properties made by a continuous production of the copolymer using a metallocene catalyst.

TABLE 6

Example Liquid EPDM-VNB Copolymer Properties by Metallocene Catalyst Continuous Production

| Polymer Properties | Example 11 | Example 12 | Example 13 | Example 14 | Example 15 |
|---|---|---|---|---|---|
| C3, Mass % | 48.7 | 47.5 | 46.3 | 44.0 | 46.0 |
| VNB, Mass % | 4.0 | 7.3 | 8.6 | 9.6 | 8.8 |
| Oil Solution Viscosity at 5%, 100° C. (cST) | 4.94 | 5.26 | 6.66 | 7.19 | 8.11 |
| Brookfield Viscosity at 100° C. (cP) | 13,721 | 24,994 | 86,194 | 125,032 | 173,533 |
| $M_w$ (Da) | 5,144 | 9,370 | 32,314 | 46,874 | 65,057 |
| $M_n$ (Da) | 1,264 | 1,747 | 3,065 | 3,447 | 2,663 |
| PDI (Mw/Mn) | 4.07 | 5.36 | 10.54 | 13.60 | 24.4 |
| Wt %, $M_w >$ $10^6$ (Da) | 0.02 | 0.22 | 0.10 | 0.44 | N/A |
| Wt %, $M_w <$ $10^5$ (Da) | 99.8 | 99.3 | 94.2 | 91.4 | N/A |
| LCB/polymer | N/A | N/A | 8.99 | 14.96 | 9.91 |
| $T_g$ (° C.) | −70.3 | −60.4 | −52.7 | −50.5 | −52.9 |
| % Crystallinity | <1.0 | <1.0 | <1.0 | <1.0 | <1.0 |

Table 7 shows the vinyl norbornene content of the EPDM-VNB copolymers made by a continuous process using a metallocene catalyst at various vinyl norbornene solution flow rates. The propylene flow rates were adjusted to maintain propylene between 49 and 55 in the ethylene:propylene weight ratio.

TABLE 7

Vinyl Norbornene Content in the EPDM-VNB Copolymer

| Sample | VNB solution flow grams/hour | VNB wt. % in polymer | Propylene Flow, grams/hour | E:P Ratio |
|---|---|---|---|---|
| 1 | 90 | 1.5 | 552 | 45/55 |
| 2 | 116 | 3.8 | 648 | 50/50 |
| 3 | 120 | 4.8 | 1,050 | 51/49 |
| 4 | 190 | 6.8 | 690 | 43/57 |
| 5 | 216 | 7.3 | 750 | 48/52 |
| 6 | 242 | 8.8 | 900 | 51/49 |
| 7 | 294 | 9.7 | 1140 | 49/51 |

Examples 1-15 show that low molecular weight liquid EPDM-VNB copolymers can be made with both Ziegler-Natta and metallocene catalysts in continuous production processes. Careful selection of the catalyst mixture can allow production of a broad range of liquid VNB-based EPDM polymers.

Finally, batch production of liquid EPDM-VNB copolymer using a metallocene catalyst were performed to show the varying ethylene:propylene ratios and vinyl norbornene content in the EPDM-VNB copolymers while keeping the polymer in liquid form with low molecular weight. The batch production of liquid EPDM-VNB copolymers using a metallocene catalyst are shown in Examples 16-19.

The batch production polymerization reactions were carried out in a 4.0-liter batch reactor by charging the reactor with 1,800 grams of hexane followed by bringing the reactor to operating temperature. The reactor was then charged with monomers propylene, ethylene, and hydrogen if used. Catalyst and co-catalyst were added to initiate polymerization. Shortly after initiation of polymerization the specified amount of vinyl norbornene was added and the reaction allowed to proceed for the specified time. At the end of the reaction the polymer was removed and analyzed for physical properties.

Table 8 shows the batch polymerization reaction parameters using a metallocene catalyst to produce liquid EPDM-VNB copolymers.

TABLE 8

Batch Reactor Preparation of Metallocene Catalyzed Liquid EPDM-VNB Copolymers

| Reaction Parameter | Example 16 | Example 17 | Example 18 | Example 19 |
|---|---|---|---|---|
| Reaction Temperature, ° C. | 70 | 70 | 70 | 70 |
| Reactor pressure, KPa (psig) | 70 | 70 | 70 | 70 |
| Agitation speed, rpm | 1,500 | 1,500 | 1,500 | 1,500 |
| Catalyst | 5036* | 5036 | 5036 | 5036 |
| Co-catalyst 1 | B1* | B1 | B1 | B1 |
| Co-catalyst 2 | MAO* | MAO | MAO | MAO |
| Co-catalyst 1/Catalyst Molar Ratio | 1/1 | 1/1 | 1/1 | 1/1 |
| Co-catalyst 2/Catalyst Molar Ratio | 500/1 | 500/1 | 500/1 | 500/1 |
| Catalyst, g | 0.02 | 0.024 | 0.024 | 0.024 |
| VNB, g | 17 | 25 | 25 | 25 |
| Ethylene Flow, g/min | 8.1 | 8.4 | 5.5 | 4.1 |
| Propylene Flow, g/min | 14.1 | 13.4 | 11.7 | 11.8 |
| Solvent, g | 1,800 | 1,800 | 1,800 | 1,800 |
| Hydrogen (psig) | 10 | 30 | 36.5 | 37.5 |
| Run time, min | 10 | 10 | 10 | 10 |

The ethylene bis(indenyl) zirconium dichloride (Eurecene 5036) was from Lanxess, mol. wt.=418.47 g/mol; B1 was N,N-Dimethylanilinium tetrakis(pentaflourophenyl) borate from W.R. Grace; and MAO=Methylaluminoxane from W.R. Grace.

Table 9 shows the EPDM-VNB copolymers and their properties made by a batch production of the copolymer using a metallocene catalyst.

TABLE 9

Example Liquid EPDM-VNB Copolymer Properties by Metallocene Catalyst Batch Process

| Polymer Properties | Example 16 | Example 17 | Example 18 | Example 19 |
|---|---|---|---|---|
| C3, Mass % | 48.6 | 46.0 | 43.7 | 46.8 |
| VNB, Mass % | 4.6 | 6.3 | 8.9 | 8.9 |
| Oil Solution Viscosity at 5%, 100° C. (cST) | 6.59 | 5.65 | 5.14 | 5.10 |
| Brookfield Viscosity at 100° C. (cP) | 116,080 | 37,802 | 26,551 | 24,423 |
| Mw (Da) | 43,518 | 14,172 | 9,954 | 9,531 |
| Mn (Da) | 4,178 | 2,794 | 2,068 | 2,086 |
| PDI (Mw/Mn) | 10.42 | 5.07 | 4.81 | 4.57 |
| Wt. %, Mw > $10^6$ (Da) | 0.68 | 0.33 | 0.56 | 0.25 |
| Wt. %, Mw < $10^5$ (Da) | 91.9 | 98.5 | 98.6 | 99.1 |
| LCB/polymer | 7.61 | N/A | N/A | N/A |
| $T_g$ (° C.) | −54.5 | −54.5 | −54.8 | −50.7 |
| % Crystallinity | <1.0 | <1.0 | <1.0 | <1.0 |

Results show that liquid EPDM having significant amounts of vinyl norbornene can be produced in a batch process using metallocene catalyst systems. Depending on the metallocene catalyst selected, the liquid EPDM-VNB copolymers can be produced with terminal unsaturation (O-hydrogen elimination) in addition to pendant unsaturation provided by incorporation on VNB. Both types can be verified by Fourier Transform Infrared (FTIR) spectroscopy. Unsaturated terminal groups such as vinyl and vinylidene are indicated by absorption peaks at 890 $cm^{-1}$ (ASTM D 6248-98). FTIR spectra of liquid EPDM-VNB copolymers produced in continuous polymerization using Ziegler-Natta and metallocene catalyst systems are shown in FIGS. 2-6.

Figure 2:
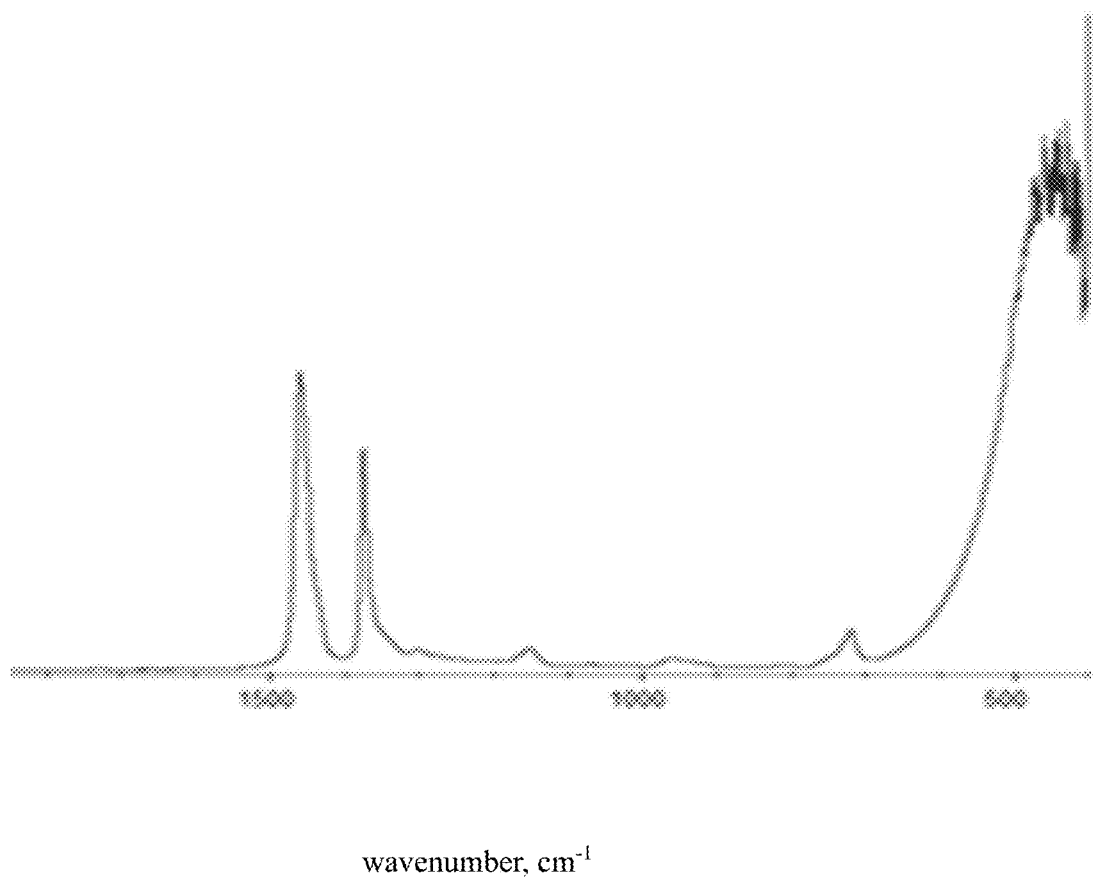
FIG. 2 is an infrared spectrum (IR) of an EPDM-VNB copolymer prepared with ZN catalyst system shows the absence of terminal unsaturation at 890 $cm^{-1}$ (VNB=0 wt %).
Figure 3:
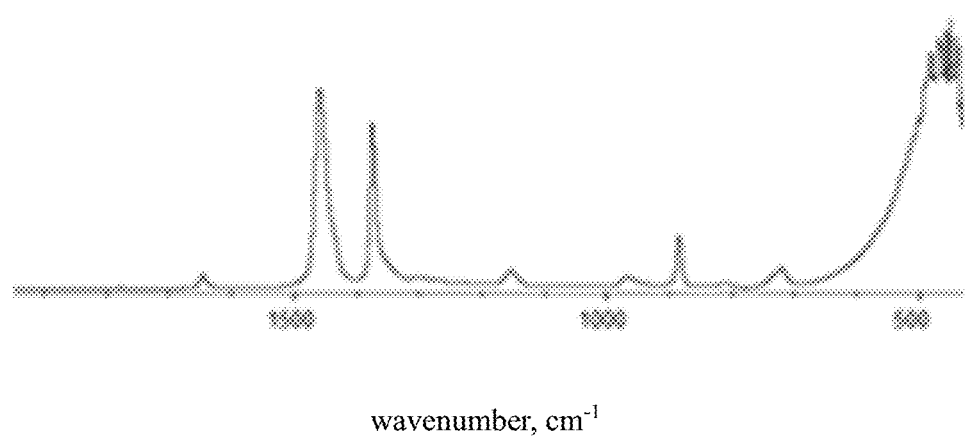
FIG. 3 is an infrared spectrum of an EPDM-VNB copolymer prepared with metallocene catalyst system shows the presence of terminal unsaturation at 890 $cm^{-1}$ (VNB=0 wt %).

FIG. 2 shows the spectrum of a liquid EPDM-VNB copolymers produced with Ziegler-Natta catalyst. The absence of absorbance at 890 cm$^{-1}$ indicates that polymer chain termination is saturated. FIG. 3 shows the spectrum of a liquid EPDM-VNB copolymers produced with a metallocene catalyst; the presence of absorbance at 890 cm$^{-1}$ is indicative of unsaturated polymer chain termination.

Figure 4:
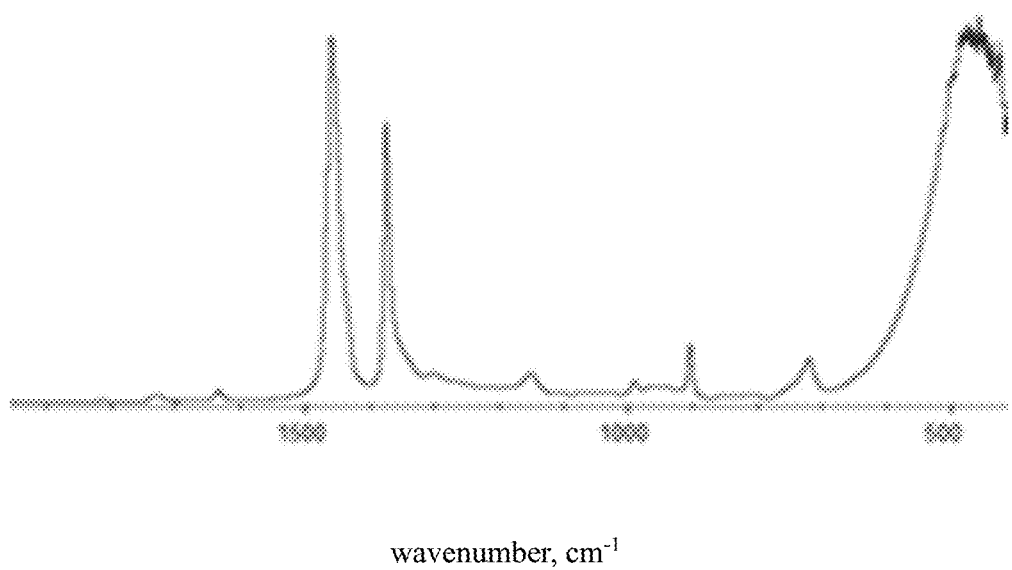
FIG. 4 is an infrared spectrum of a liquid ethylene/propylene/vinyl norbornene terpolymer prepared with Ziegler-Natta (ZN) catalyst system shows absence of terminal unsaturation at 890 $cm^{-1}$ and the presence of VNB unsaturation at 900 $cm^{-1}$ (VNB=5.11 wt %).
Figure 5:
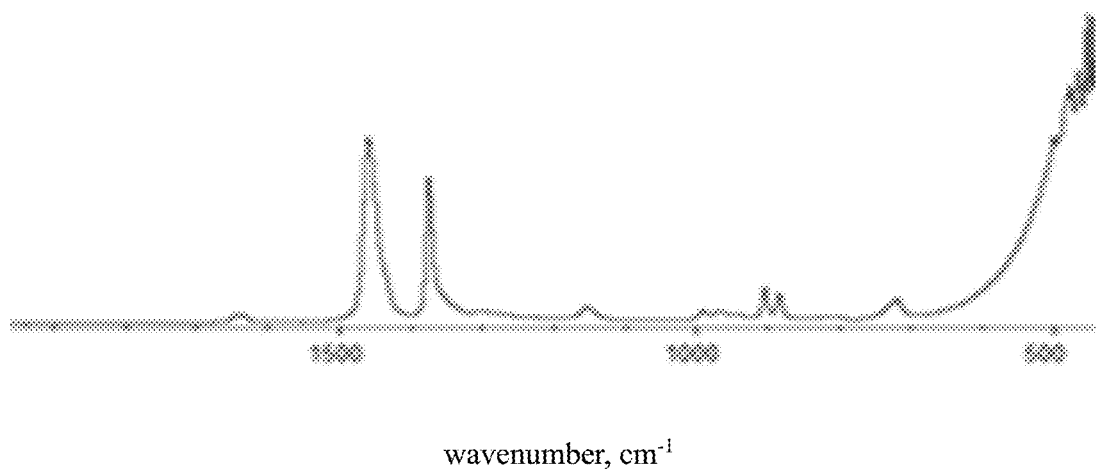
FIG. 5 is an infrared spectrum liquid EPDM-VNB copolymer prepared with metallocene catalyst system shows the presence of both terminal (890 $cm^{-1}$) and VNB (900 $cm^{-1}$) unsaturation (VNB=5.157 wt %).

FIG. 4 shows a liquid EPDM-VNB copolymers produced with Ziegler-Natta catalyst having between 4 and 5 wt % of VNB; the spectrum shows absorbance at 900 cm$^{-1}$ and none at 890 cm$^{-1}$, indicating unsaturation provided by VNB and none by terminal unsaturation. FIG. 5 shows the spectrum of a liquid EPDM-VNB copolymers produced with metallocene catalyst and VNB content of 4 to 5 wt %. The spectrum shows absorbance at 890 cm$^{-1}$ and 900 cm$^{-1}$ indicating unsaturation from VNB and β-hydrogen elimination. This feature, not seen in Ziegler-Natta produced samples, gives metallocene-based polymers the potential to undergo post reactions by way of internal pendant and terminal unsaturation.

Figure 6:
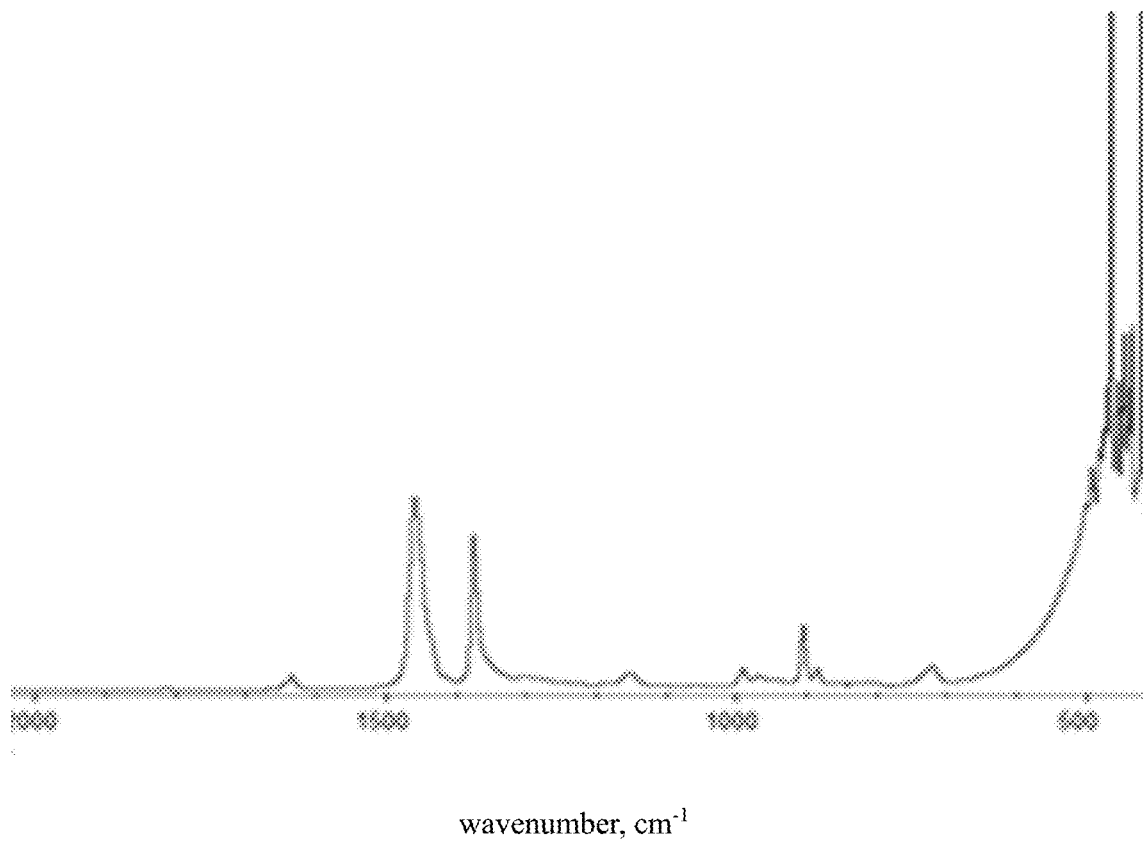
FIG. 6 is an infrared spectrum of a liquid EPDM-VNB copolymer prepared with metallocene catalyst system having greater than 9.7 weight percent VNB (VNB=9.74 wt %).

FIG. 6 shows a liquid EPDM-VNB copolymers, produced with metallocene catalyst, having VNB content greater than 9.5 wt %. As VNB weight percentages increase, the inherent unsaturation observed in the copolymer diminishes (compare to FIG. 5). Without wanting to be bound by theory, this suggests that the mechanism for chain termination is probably changing, possibly from a β-hydrogen transfer to a monomer (VNB) mechanism.

In addition, crosslinkable EPDM-diene copolymers were made by mixing a low molecular weight EPDM with various VNB (0.65 to 10.9 wt %) content with a high molecular weight polymer having low (0.65 to 2 wt %) VNB content. Tables 10-12 shows examples of the EPDM-diene copolymers blends. Example 20 is a high molecular weight copolymer and Example 21 is a low molecular weight copolymer.

TABLE 10

Parent Polymers for Blends

| Polymer | E/P | Mass % VNB | Mw (Da) | Mn (Da) | PDI |
|---|---|---|---|---|---|
| Example 20 | 63/37 | 1.0 | 842418 | 169142 | 4.99 |
| Example 21 | 50/50 | 10.9 | 55534 | 16280 | 3.45 |

TABLE 11

Polymer Blend Method

| Blend No | Wt % HMw | Wt % LMw | Wt (grams) Example 20 | Wt (grams) Example 21 |
|---|---|---|---|---|
| B1 | 50 | 50 | 150 | 150 |
| B2 | 60 | 40 | 120 | 80 |
| B3 | 40 | 60 | 80 | 120 |
| B4 | 80 | 20 | 160 | 40 |
| B5 | 20 | 80 | 40 | 160 |
| B6 | 30 | 70 | 60 | 140 |

TABLE 12

Properties of Polymer Blends

| Blend No | Wt % Low Mw | Mass % VNB | E/P Ratio | Mw (Da) | Mn (Da) | PDI | ML1 + 4 @ 125° C. | Tan δ (150° C., 0.84 rad/s) |
|---|---|---|---|---|---|---|---|---|
| B1 | 50 | 6.25 | 57/43 | 375568 | 32637 | 11.63 | 61.6 | 0.436 |
| B2 | 40 | 5.80 | 57/43 | 561049 | 34014 | 16.47 | 96.7 | 0.384 |
| B3 | 60 | 7.20 | 54/46 | 290311 | 29012 | 10.09 | 37.0 | 0.464 |
| B4 | 20 | 4.70 | 57/43 | 643555 | 49201 | 13.34 | 149.0 | 0.332 |
| B5 | 80 | 9.17 | 51/49 | 183182 | 17515 | 10.41 | 15.5 | 0.533 |
| B6 | 70 | 8.37 | 54/46 | 259058 | 22423 | 11.79 | 21.6 | 0.537 |

Figure 7:
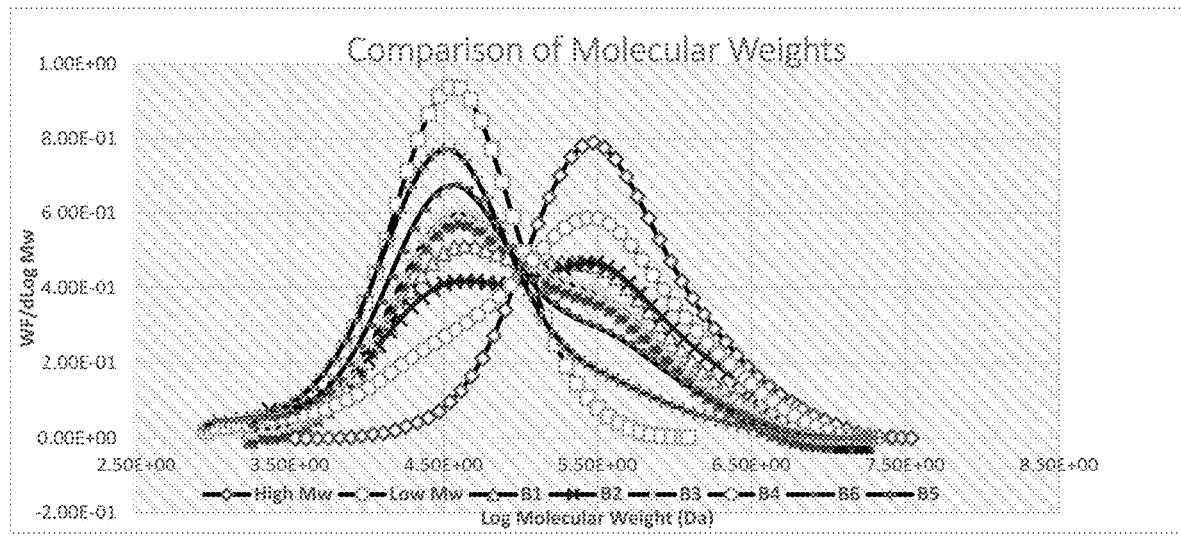
FIG. 7 shows an overlay of Gel Permeation Chromatography (GPC) traces of the polymer blends.
Figure 8:
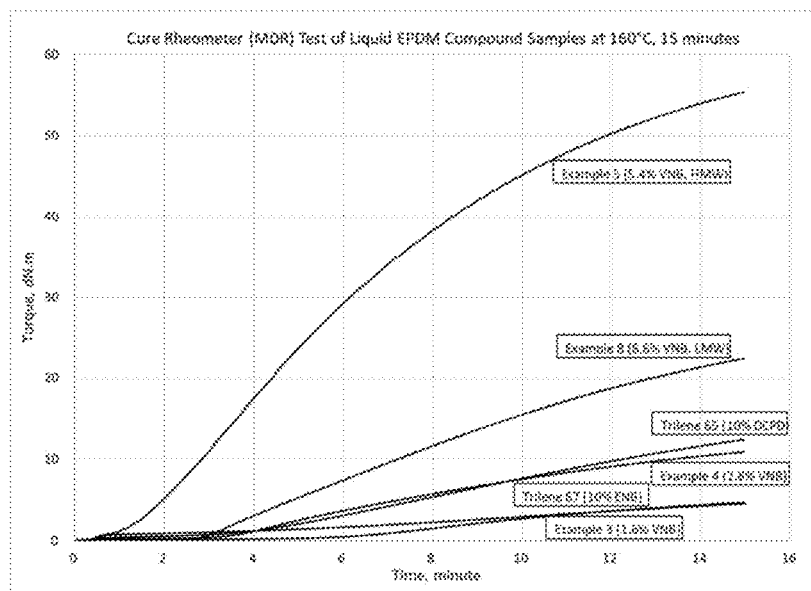
FIG. 8 shows a cure Moving Die Rheometer (MDR) test of liquid EPDM-diene copolymers made with various content of nonconjugated diene compounds at 160° C. for 15 minutes.
Figure 9:
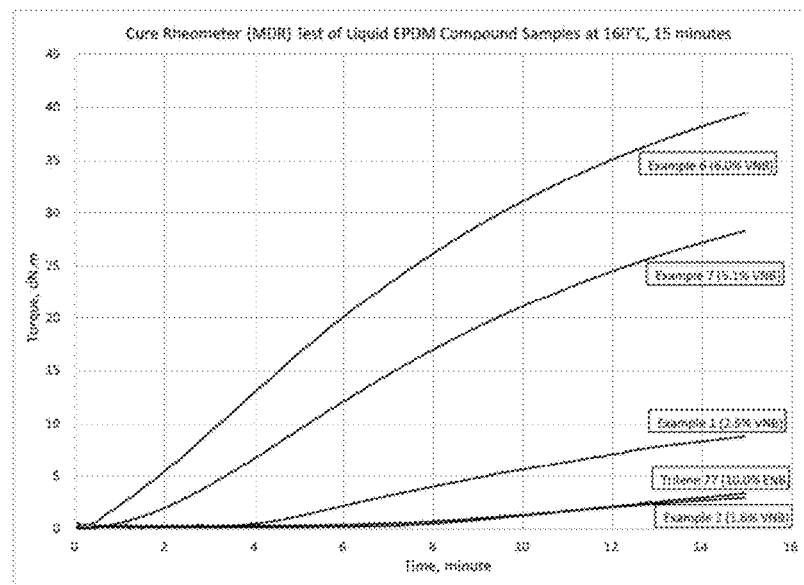
FIG. 9 shows a cure rheometer test of liquid EPDM copolymers made with various content of nonconjugated diene compounds at 160° C. for 15 minutes.
Figure 10:
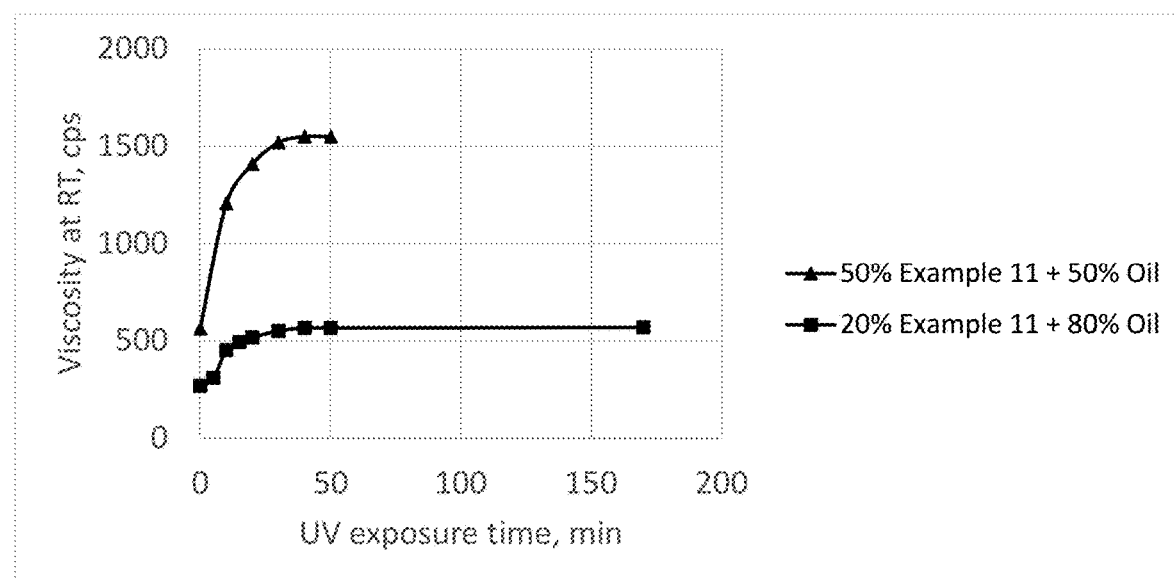
FIG. 10 is a graph of viscosity respect to cure time of TRILENE® and paraffinic oil were blended and cured by ultraviolet light.

FIG. 7 shows an overlay of Gel Permeation Chromatography (GPC) traces of the polymer blends. A broad range of molecular weights and molecular weight distributions are shown.

To compare the crosslinking behavior of liquid EPDM polymers with low LIP ratios (<65/35) and different dienes (ENB, DCPD, VNB) using peroxide cure formulations were made. The results are shown in Table 13.

TABLE 13

Comparison of Crosslinking Behavior of Liquid EPDM Copolymers with Low E/P Ratios (<65/35) and Different Nonconjugated Dienes

| Ingredient (PHR) | A | B | C | D | E | F |
|---|---|---|---|---|---|---|
| Masterbatch Mix | | | | | | |
| Trilene 65 | 100.0 | | | | | |
| Trilene 67 | | 100.0 | | | | |
| Example 3 | | | 100.0 | | | |
| Example 4 | | | | 100.0 | | |
| Example 5 | | | | | 100.0 | |

TABLE 13-continued

Comparison of Crosslinking Behavior of Liquid EPDM Copolymers with Low E/P Ratios (<65/35) and Different Nonconjugated Dienes

| | | | | | | |
|---|---|---|---|---|---|---|
| Example 8 | | | | | | 100.0 |
| Silane-treated Silica, Reinforcing Filler | 40.0 | 40.0 | 40.0 | 40.0 | 40.0 | 40.0 |
| 4,4'-Bis(a,a'-dimethylbenzyl/diphenylamine), Antioxidant | 1.0 | 1.0 | 1.0 | 1.0 | 1.0 | 1.0 |
| Paraffinic Oil | 20.0 | 20.0 | 20.0 | 20.0 | 20.0 | 20.0 |
| Zinc Oxide | 7.5 | 7.5 | 7.5 | 7.5 | 7.5 | 7.5 |
| Zinc Stearate | 1.5 | 1.5 | 1.5 | 1.5 | 1.5 | 1.5 |
| MASTERBATCH | 170.0 | 170.0 | 170.0 | 170.0 | 170.0 | 170.0 |
| Final Mix | | | | | | |
| Trimethylolpropane Trimethacrylate, Coagent | 2.0 | 2.0 | 2.0 | 2.0 | 2.0 | 2.0 |
| Dicumyl Peroxide, 40% Active | 10.0 | 10.0 | 10.0 | 10.0 | 10.0 | 10.0 |
| TOTAL | 182.0 | 182.0 | 182.0 | 182.0 | 182.0 | 182.0 |

| Polymer | A<br>Trilene 65 (10% DCPD) | B<br>Trilene 67 (10% ENB) | C<br>Example 3 (1.6% VNB) | D<br>Example 4 (2.8% VNB) | E<br>Example 5 (5.4% VNB, HMW) | F<br>Example 8 (6.6% VNB, LMW) |
|---|---|---|---|---|---|---|
| Rheometer at 160° C., 15 minutes | | | | | | |
| ML, dN-m | 0.03 | 0.00 | 0.06 | 0.05 | 0.05 | 0.02 |
| MH, dN-m | 12.46 | 4.60 | 4.69 | 10.89 | 55.44 | 22.43 |
| ts2, minutes | 5.22 | 7.88 | 9.33 | 4.88 | 1.39 | 3.65 |
| tc90, minutes | 13.52 | 13.44 | 13.53 | 13.05 | 11.84 | 13.08 |
| Cured Properties (Cure tc90 + 3 minutes @ 160° C.) | | | | | | |
| 100% Modulus, MPa, | 1.0 | 0.2 | 0.5 | 0.5 | 3.6 | 1.1 |
| 200% Modulus, Mpa, | 1.6 | 0.2 | 0.8 | 0.9 | *** | 1.3 |
| 300% Modulus, MPa, | 1.8 | 0.2 | 0.9 | 1.1 | *** | 0.4 |
| Tensile Strength at Break, MPa | 2.1 | 0.2 | 1.0 | 1.0 | 4.2 | 1.7 |
| Elongation at Break, % | 323 | 140 | 333 | 292 | 111 | 183 |
| Tear Strength, Die C, KN/m | 10.0 | 3.0 | 5.0 | 5.0 | 8.0 | 6.0 |

Comparison of crosslinking behavior of liquid EPDM polymer samples with high E/P ratios (>65/35) and different dienes (ENB, VNB) in a peroxide cure formulation To compare the crosslinking behavior of liquid EPDM polymers with high LIP ratios (>65/35) and different dienes (ENB, DCPD, VNB) using peroxide cure formulations were made. The results are shown in Table 14

TABLE 14

Comparison of Crosslinking Behavior of Liquid EPDM Copolymers with High E/P Ratios (>65/35) and Different Nonconjugated Dienes

| Ingredient (PHR) | A | B | C | D | E |
|---|---|---|---|---|---|
| Masterbatch Mix | | | | | |
| Trilene 77 | 100.0 | | | | |
| Example 1 | | 100.0 | | | |
| Example 2 | | | 100.0 | | |
| Example 6 | | | | 100.0 | |
| Example 7 | | | | | 100.0 |
| Silane-treated Silica, Reinforcing Filler | 40.0 | 40.0 | 40.0 | 40.0 | 40.0 |
| 4,4'-Bis(a,a'-dimethylbenzyl/diphenylamine), Antioxidant | 1.0 | 1.0 | 1.0 | 1.0 | 1.0 |
| Paraffinic Oil | 20.0 | 20.0 | 20.0 | 20.0 | 20.0 |
| Zinc Oxide | 7.5 | 7.5 | 7.5 | 7.5 | 7.5 |
| Zinc Stearate | 1.5 | 1.5 | 1.5 | 1.5 | 1.5 |
| MASTERBATCH Final Mix | 170.0 | 170.0 | 170.0 | 170.0 | 170.0 |

TABLE 14-continued

Comparison of Crosslinking Behavior of Liquid EPDM Copolymers with High E/P Ratios (>65/35) and Different Nonconjugated Dienes

| | | | | | |
|---|---|---|---|---|---|
| Trimethylolpropane Trimethacrylate, Coagent | 2.0 | 2.0 | 2.0 | 2.0 | 2.0 |
| Dicumyl Peroxide, 40% Active | 10.0 | 10.0 | 10.0 | 10.0 | 10.0 |
| TOTAL | 182.0 | 182.0 | 182.0 | 182.0 | 182.0 |

| Polymer | A<br>Trilene 77<br>(10% ENB) | B<br>Example 1<br>(2.5% VNB) | C<br>Example 2<br>(1.6% VNB) | D<br>Example 6<br>(6.0% VNB) | E<br>Example 7<br>(5.1% VNB) |
|---|---|---|---|---|---|
| Rheometer at 160° C., 15 minutes | | | | | |
| ML, dN-m | −0.12 | 0.05 | 0.11 | 0.37 | 0.04 |
| MH, dN-m | 3.37 | 8.84 | 2.91 | 39.49 | 28.30 |
| ts2, minutes | 12.15 | 6.12 | 13.06 | 1.11 | 2.17 |
| tc90, minutes | 14.25 | 13.25 | 13.90 | 12.29 | 12.70 |
| Cured Properties (Cure tc 90 + 3 minutes @ 160° C.) | | | | | |
| Hardness, Shore A | 64 | 45 | 50 | 67 | 60 |
| 100% Modulus, MPa | *** | 1.4 | 1.1 | 4.6 | *** |
| 200% Modulus, MPa | *** | 2.1 | *** | *** | *** |
| Tensile Strength at Break, MPa, | 1.7 | 2.2 | 1.1 | 5.6 | 3.3 |
| Elongation at Break, % | 23 | 207 | 164 | 113 | 88 |
| Tear Strength, Die C, kN/m | 10 | 7 | 6 | 9 | 5 |

Evaluation of liquid EPDM-diene copolymer samples with low E/P ratios (<65/35) was performed using the nonconjugated dienes, ENB, DCPD, and VNB in a UV cure formulation.

TABLE 15

Low E/P EPDM-Diene Copolymer for UV Cure Formulation

| Ingredient | A | B | C | D | E | F |
|---|---|---|---|---|---|---|
| Masterbatch Mix | | | | | | |
| Trilene 65 | 100.0 | | | | | |
| Trilene 67 | | 100.0 | | | | |
| Example 3 | | | 100.0 | | | |
| Example 4 | | | | 100.0 | | |
| Example 5 | | | | | 100.0 | |
| Example 8 | | | | | | 100.0 |
| Silane-treated Silica, Reinforcing Filler | 40.0 | 40.0 | 40.0 | 40.0 | 40.0 | 40.0 |
| 4,4'-Bis(a,a'-dimethylbenzyl/diphenylamine), Antioxidant | 1.0 | 1.0 | 1.0 | 1.0 | 1.0 | 1.0 |
| Paraffinic Oil | 20.0 | 20.0 | 20.0 | 20.0 | 20.0 | 20.0 |
| Zinc Oxide | 7.5 | 7.5 | 7.5 | 7.5 | 7.5 | 7.5 |
| Zinc Stearate | 1.5 | 1.5 | 1.5 | 1.5 | 1.5 | 1.5 |
| MASTERBATCH | 170.0 | 170.0 | 170.0 | 170.0 | 170.0 | 170.0 |
| Final Mix | | | | | | |
| Bis-Acyl-Phosphine Oxide, Photoinitiator | 5.0 | 5.0 | 5.0 | 5.0 | 5.0 | 5.0 |
| Trimethylolpropane Trimethacrylate, Coagent | 2.00 | 2.00 | 2.00 | 2.00 | 2.00 | 2.0 |
| Dicumyl Peroxide, 40% Active | 10.0 | 10.0 | 10.0 | 10.0 | 10.0 | 10.0 |
| TOTAL | 182.0 | 182.0 | 182.0 | 182.0 | 182.0 | 182.0 |

TABLE 15-continued

Low E/P EPDM-Diene Copolymer for UV Cure Formulation

| Polymer | A Trilene 65 | B Trilene 67 | C Example 3 | D Example 4 | E Example 5 | F Example 8 |
|---|---|---|---|---|---|---|
| | 45.0% C2, 10% DCPD | 45.0% C2, 9.5% ENB | 50.4% C2, 1.6% VNB | 60.5% C2, 2.8% VNB | 46.7% C2, 5.4% VNB, HMW | 46.7% C2, 6.6% VNB, LMW |

Evaluation of liquid VNB EPDM copolymers as viscosity boosters in mineral oil using UV crosslinking was performed. VNB Trilene and paraffinic oil were blended and cured by UV light. Samples were blended with magnetic bar under UV exposure. All viscosity numbers are measured at room temperature. The results are shown in Tables 16 and 17.

TABLE 16

Liquid VNB EPDM Copolymers as Viscosity Boosters

| | Viscosity at room temperature, cps |
|---|---|
| Example 11 | 5330 |
| Hydrotreated Paraffinic Oil | 272 |

TABLE 17

Liquid VNB EPDM Copolymers as Viscosity Boosters

| | 20% Example 11, 80% Hydrotreated Paraffinic Oil + Photoinitiator + Additive | 50% Example 11, 50% Hydrotreated Paraffinic Oil + Photoinitiator + Additive |
|---|---|---|
| Example 11, low viscosity flowable | 20% | 50% |
| Bis(2,4,6-Trimethylbenzoyl)phenylphosphine oxide, Photoinitiator | 0.06% | 0.15% |
| Poly(ethylene glycol) bis(p-dimethylaminobenzoate), Additive | 0.04% | 0.10% |
| Hydrotreated Paraffinic Oil | 80% | 50% |

In addition, experimental results indicated that it is possible to introduce VNB into the EPDM polymers at levels above 3.0 wt % while keeping the polymer gel-free. VNB-based EPDM polymers having high molecular weight and VNB content greater than 6 weight percent can be produced without gel formation. The ability for the VNB monomers to be incorporated into the polymer chains while keeping the polymer gel-free is possibly due to the VNB acting as a chain-transfer agent. This is indicated by change in Mooney value as VNB levels changed in the polymer. As VNB content increased, Mooney value decreased. This behavior is counter-intuitive; normally as diene content increases so does Mooney value. Although Mooney values decrease, the resulting polymers are still very high in molecular weight. This suggests that the polymer produced under these conditions began with extremely high molecular weight.

Figure 11:
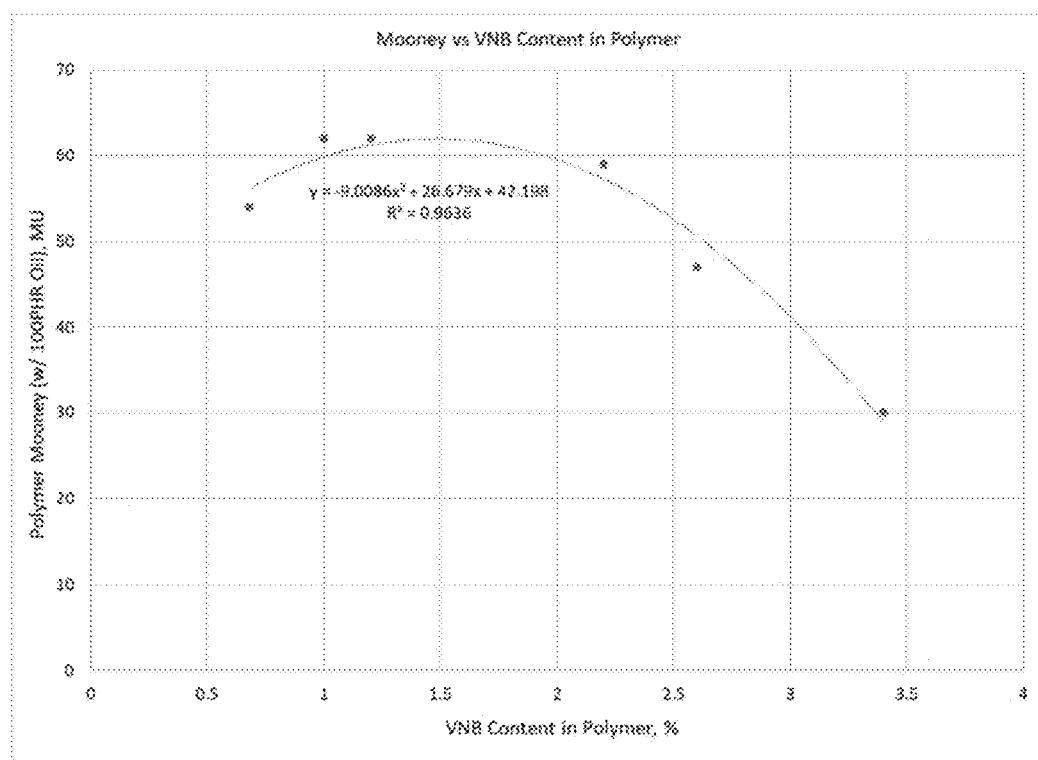
FIG. 11 is a graph of Mooney value response to VNB content for the EPDM-VNB copolymers.
Figure 12:
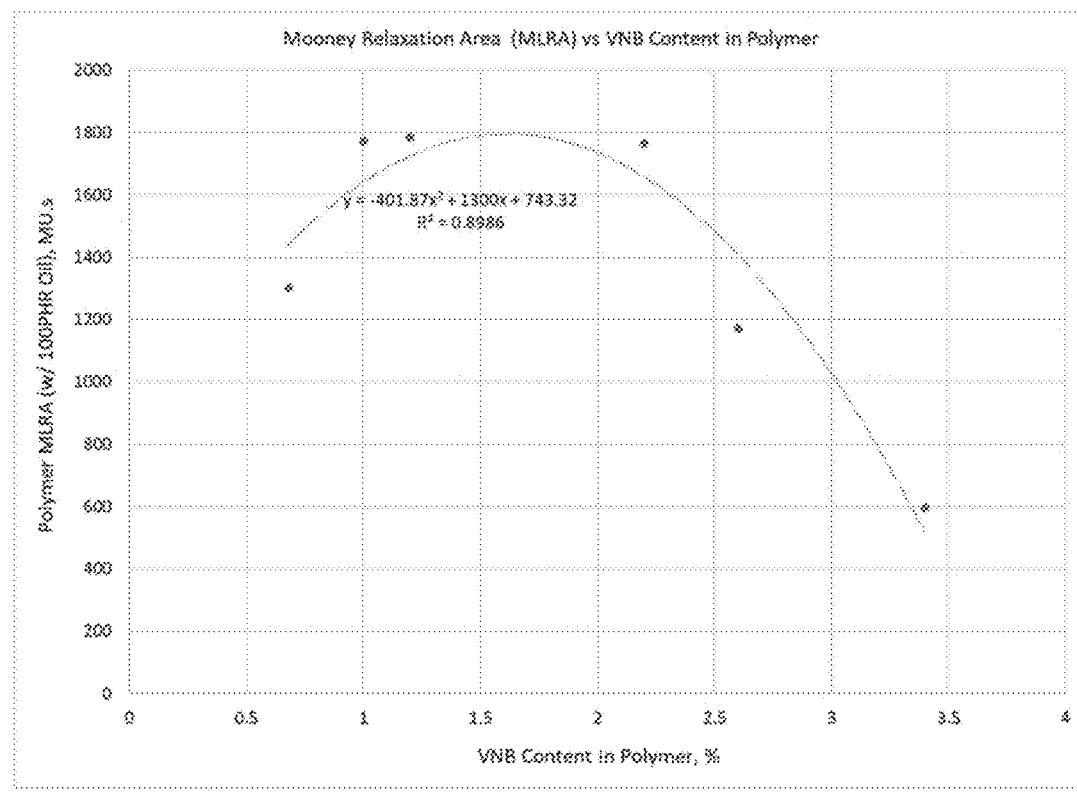
FIG. 12 is a graph showing the impact of VNB content on Mooney Relaxation Area for the EPDM-VNB copolymers.

The experimental data show that at low levels (0.6 weight percent) of VNB the molecular weight increases, reaches a maximum and starts to decrease as the VNB content increases (see FIG. 11). In addition, the Mooney Relaxation Area (MLRA), which is indicative of the level of branching in the polymer, decreases as the VNB content increases (see FIG. 12) resulting in a more linear polymer. FIG. 13 shows Table 18 providing the results for EPDM-VNB copolymers when hydrogen is used as a chain transfer agent.

Figure 14:
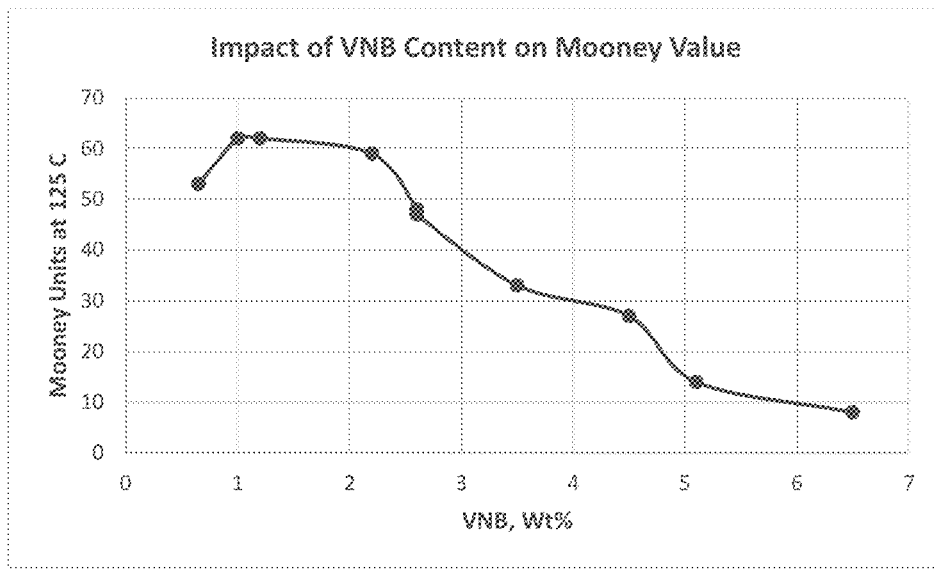
FIG. 14 is a graph showing the impact of VNB content on Mooney value on oil extended (100 parts per hundred rubber) for the EPDM-VNB copolymers.
Figure 15:
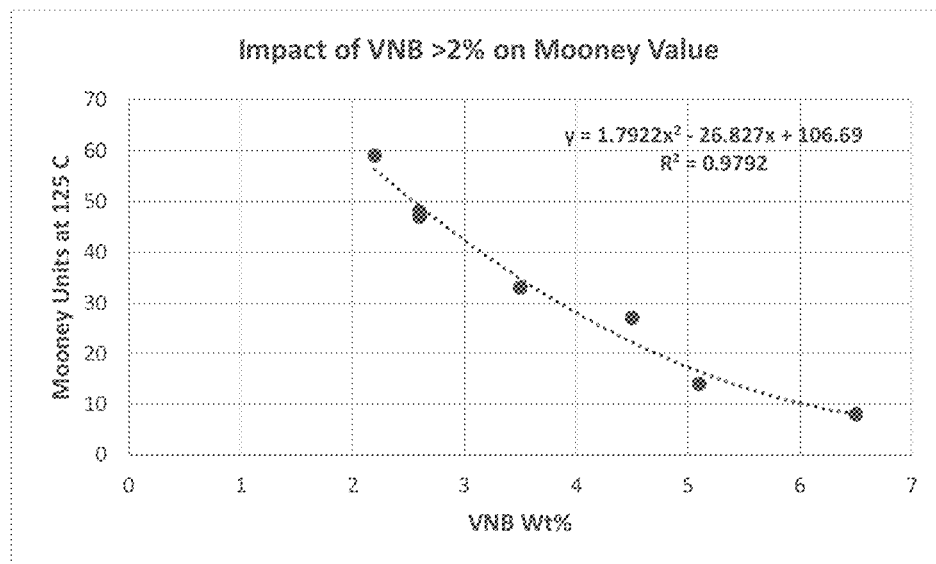
FIG. 15 is a graph showing the impact of VNB content on Mooney value when VNB exceeds 2 wt % for EPDM-VNB copolymers.
Figure 16:
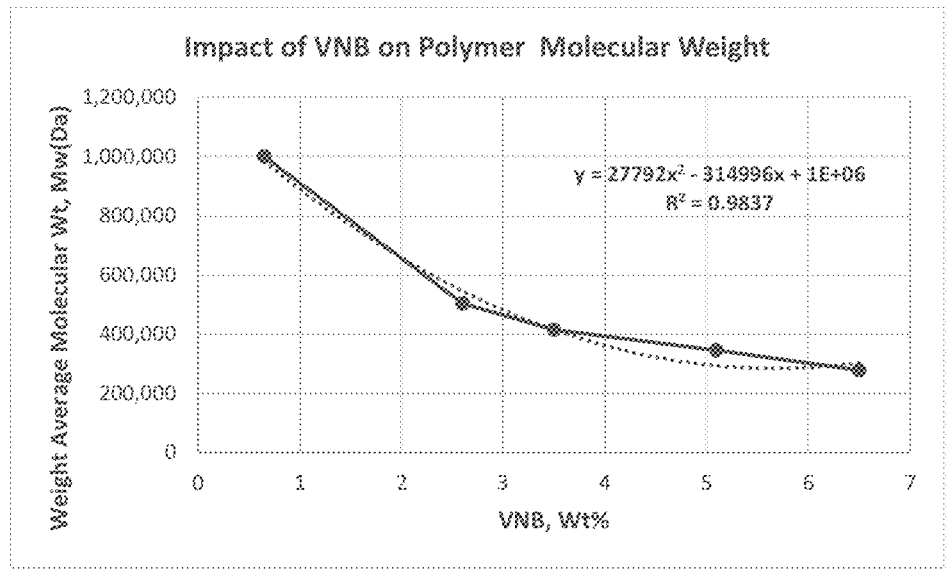
FIG. 16 is a graph showing the impact of VNB content on the molecular weight of the EPDM-VNB copolymers.
Figure 17:
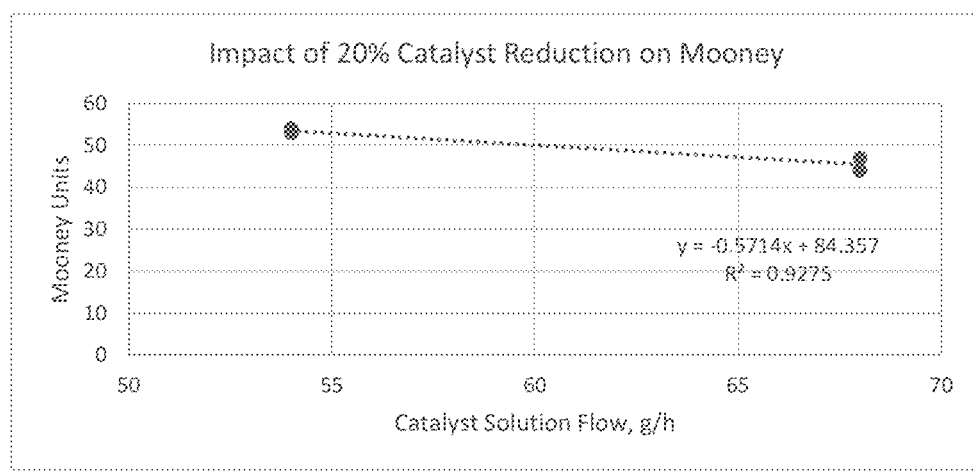
FIG. 17 is a graph showing the impact of 20% catalyst reduction on Mooney value for the EPDM-VNB copolymers.

FIG. 14 shows the impact on Mooney value of adding a wide range of VNB to the polymer. Starting at a minimum of 0.65 weight percent and adding a ten-fold amount to 6.5 the VNB acts a branching agent increasing Mooney value until it reaches the maximum of around 2.0 weight percent after which it starts to behave as a chain transfer agent as indicated by the decrease in Mooney value (see FIG. 15) and decrease in molecular weight as seen in FIG. 16. FIG. 17 shows the impact of a 20 wt % catalyst reduction on Mooney value for the EPDM-VNB copolymers.

Figure 18:
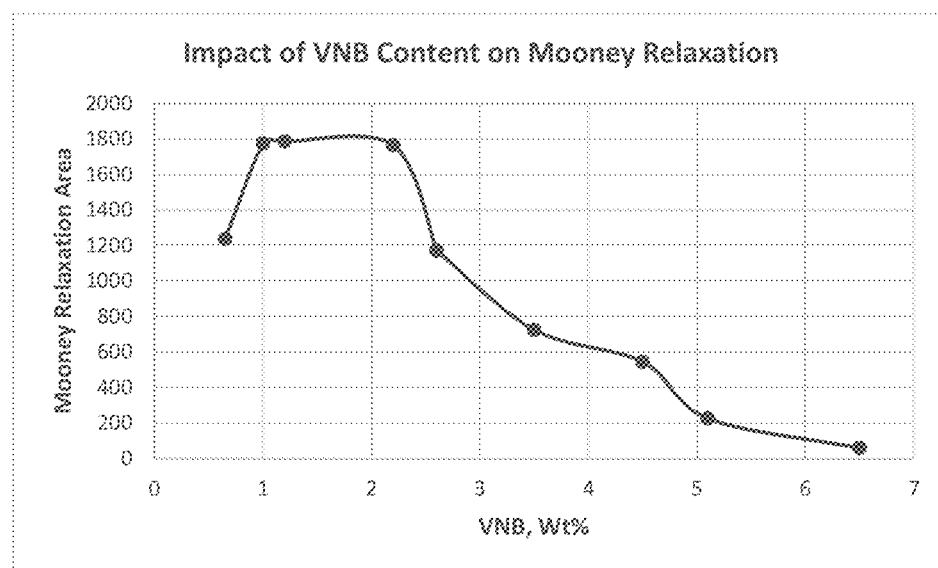
FIG. 18 is a graph showing the impact of VNB content on Mooney Relaxation Area for oil extended EPDM-VNB copolymers.
Figure 20:
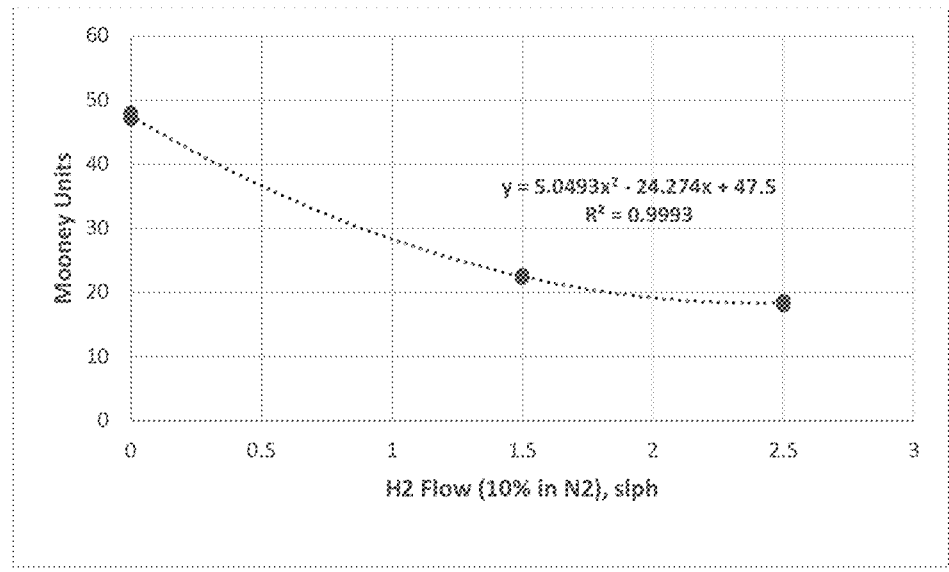
FIG. 20 is a graph showing the impact on Mooney value for EPDM-VNB copolymers when hydrogen is used as a chain transfer agent.
Figure 21:
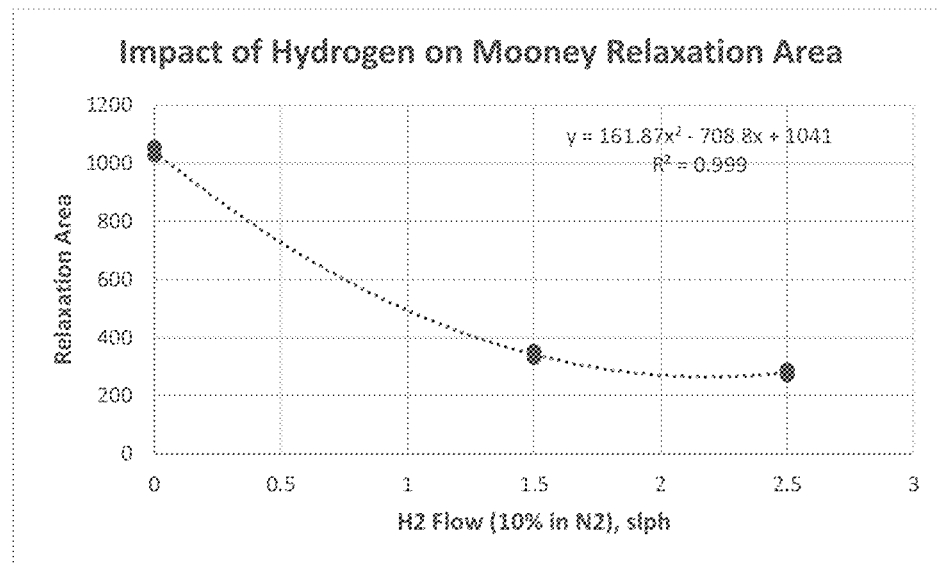
FIG. 21 is a graph showing the impact on Mooney Relaxation Area for EPDM-VNB copolymers when hydrogen is used as a chain transfer agent.
Figure 22:
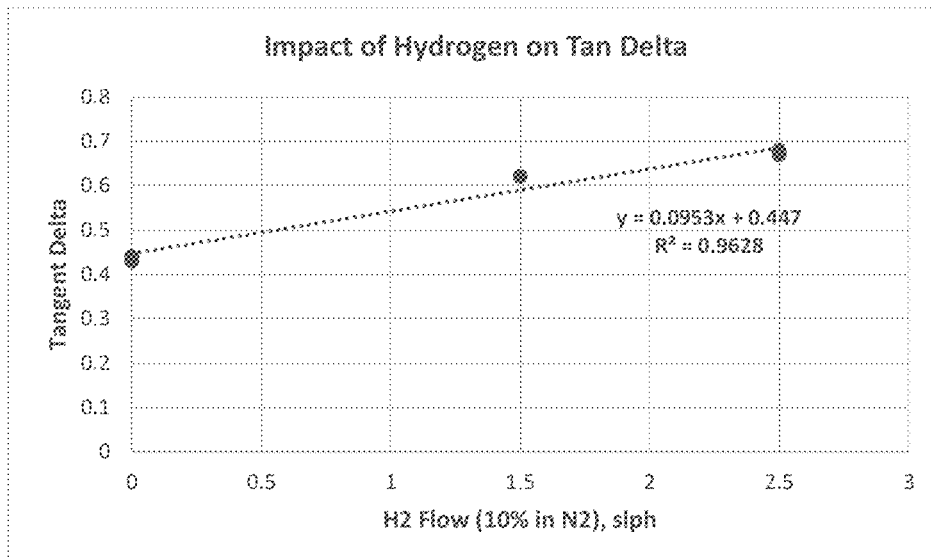
FIG. 22 is a graph showing the impact of hydrogen on EPDM-VNB copolymers branching as indicated by Tangent Delta.
Figure 23:
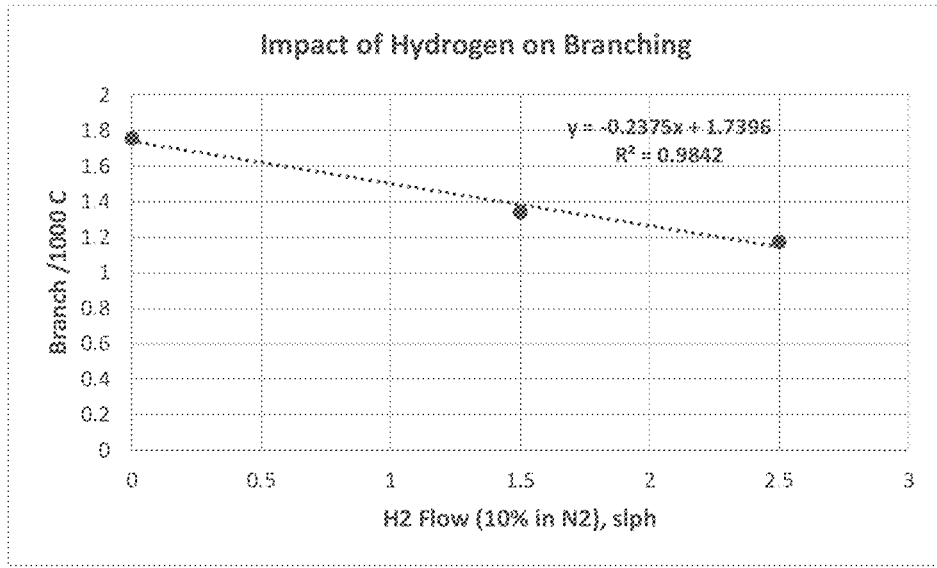
FIG. 23 is a graph showing the impact on the EPDM-VNB copolymers branching when hydrogen is used as chain transfer agent.

A similar behavior is observed for the Mooney Relaxation Area (MLRA) of the polymer (see FIG. 18) which is indicative of the level of branching in the polymer. As VNB content increases, branching decreases, suggesting the polymer is becoming more linear. For comparison, behaviors listed above for VNB can be observed when hydrogen is used as the chain transfer agent during polymerization (see FIGS. 19-23).

Figure 24:
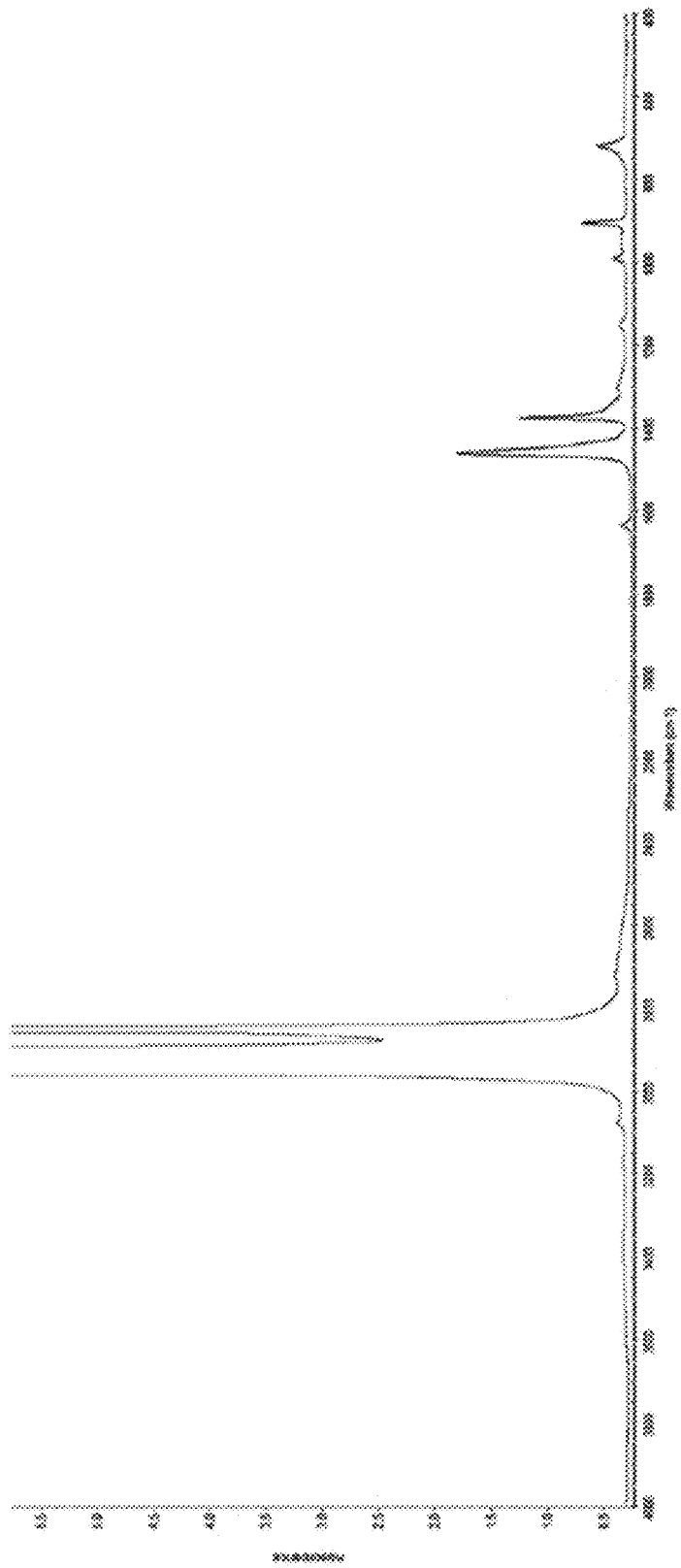
FIG. 24 is a FTIR spectrum of EPDM-VNB copolymers showing vinyl termination at 908 $cm^{-1}$.
Figure 25:
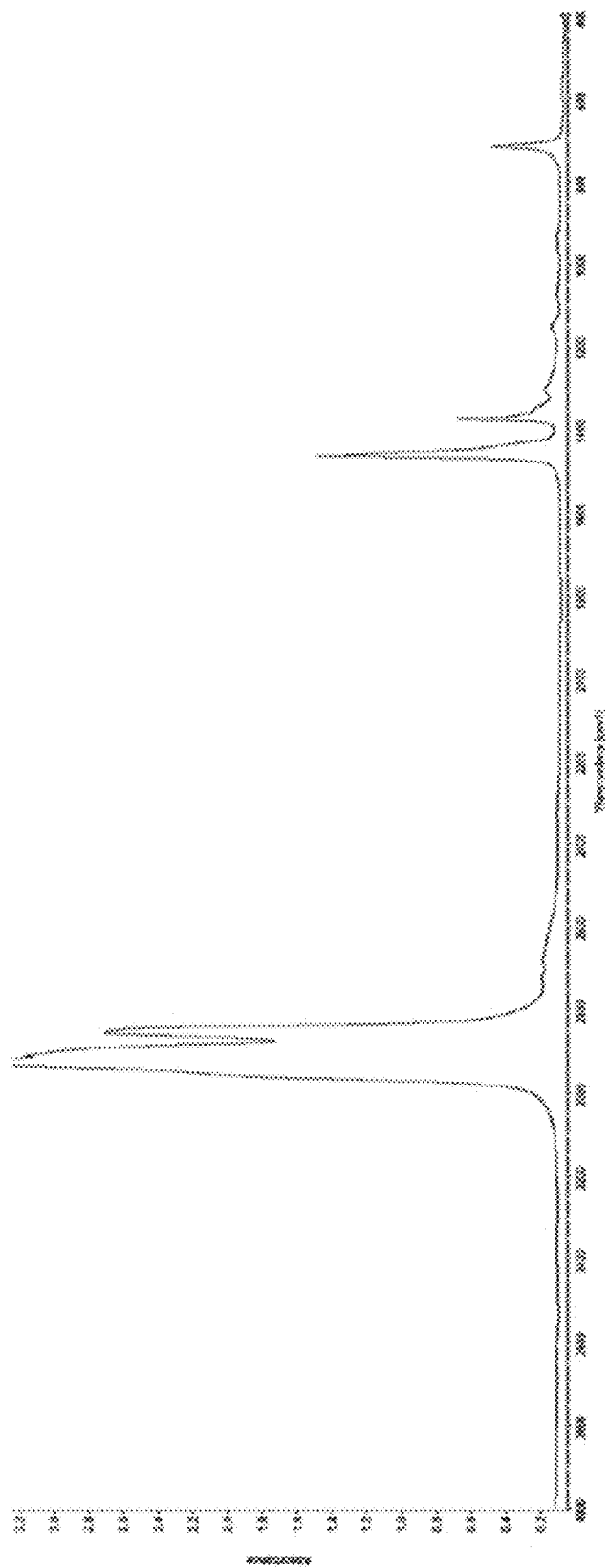
FIG. 25 is a FTIR spectrum of EPDM-VNB copolymers in which hydrogen was used a chain transfer agent.
Figure 26:
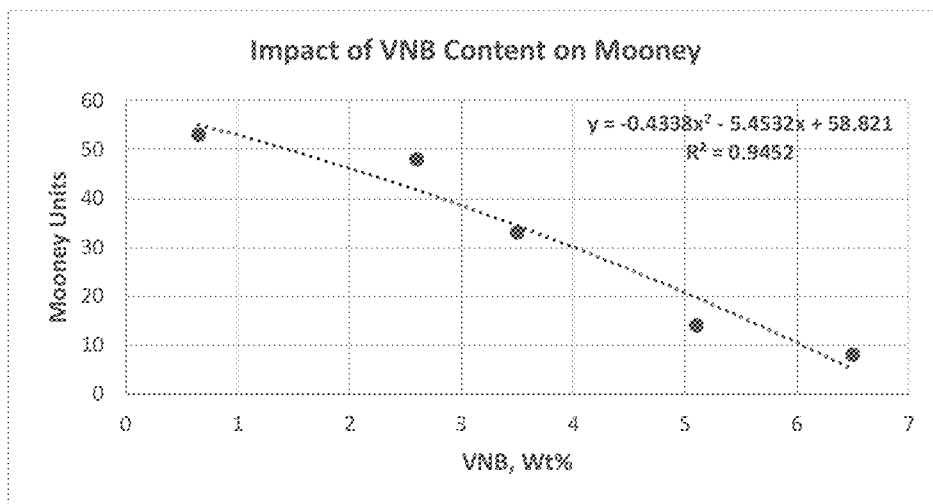
FIG. 26 is a graph showing the impact of VNB content on Mooney Relaxation Area for the EPDM-VNB copolymers.

FTIR analysis suggests that the polymers produced with the higher levels of VNB have terminal unsaturation which can result from a chain transfer to monomer mechanism. A band at 908 $cm^{-1}$ as shown in FIG. 24 is indicative of vinyl termination (ASTM D 6248-98) compared with the absence of the band in FIG. 25 which used hydrogen as the chain transfer agent.

Another observation is that as the VNB content becomes greater than 1.0% the process does not respond to changes in catalyst concentration. Normally, if catalyst concentration in the reactor decreases, the polymer molecular weight will increase. Experimental data shows that if catalyst concentration in the reactor is decreased by as much as 20%, no significant change in Mooney is observed.

TABLE 20

VNB Response (No H2, With Oil), use for ML, MLRA

| Run No | VNB | ML125 | MRLA | Mw | Mn | Mw/Mn | Branch |
|---|---|---|---|---|---|---|---|
| 707-3 | 0.65 | 53 | 1237 | 1,000,064 | 268321 | 3.94 | 1.37 |
| 712-5 | 1 | 62 | 1773 | | | | |
| 712-1 | 1.2 | 62 | 1784 | | | | |
| 712-2 | 2.2 | 59 | 1764 | | | | |
| 713-1 | 2.6 | 48 | 1169 | 503718 | 149517 | 3.36 | |
| 712-3 | 2.6 | 47 | 1171 | | | | |
| 713-2 | 3.5 | 33 | 724 | 415122 | 133550 | 3.11 | |
| 713-3 | 4.5 | 27 | 544 | 492087 | 133468 | 3.687 | |
| 713-4 | 5.1 | 14 | 226 | 345355 | 104731 | 3.28 | |
| 713-5 | 6.5 | 8 | 58 | | | | |

One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. It should also be appreciated that the numerical limits may be the values from the examples. Certain lower limits, upper limits and ranges appear in at least one claims below. All numerical values are "about" or "approximately" the indicated value, and consider experimental error and variations that would be expected by a person having ordinary skill in the art.

What is claimed is:

1. The method of making a copolymer comprising:
   adding a solvent to a reactor;
   adding propylene and a catalyst mixture to the solvent in the reactor to make a first reaction mixture, wherein the catalyst mixture comprises: one or more catalysts, one or more cocatalysts, and one or more catalyst reactivators;
   contacting ethylene with the first reaction mixture to make a second reaction mixture; and
   contacting a diene compound with the second reaction mixture to make a copolymer, wherein the diene compound is selected from the group consisting of vinyl norbornene, dicyclopentadiene, and ethylidene norbornene, wherein the copolymer has a weight average molecular weight from about 2,500 g/mol to about 1,000,000 g/mol, and wherein the copolymer has a viscosity from about 1,000 cP to about 2,500,000 cP at 100° C.

2. The method of claim 1, wherein the diene compound is vinyl norbornene.

3. The method of claim 1, wherein the diene compound is ethylidene norbornene.

4. The method of claim 1, wherein the diene compound is dicyclopentadiene.

5. The method of claim 1, wherein the method further comprises curing the copolymer with curing agent, wherein the curing agent is selected from the group consisting of one or more peroxides, one or more amines, one or more sulfur compounds, one or more organosiloxanes, 2,2'-(4-methylphenylimino) diethanol, and mixtures thereof.

6. The method of claim 1, wherein the one or more catalysts is a Ziegler-Natta catalyst.

7. The method of claim 1, wherein the one or more catalysts is vanadium oxytrichloride, wherein the one or more cocatalysts is ethyl aluminum sesquichloride, and wherein the one or more catalyst reactivators is dichlorophenylacetic acid ethyl ester.

8. The method of claim 1, wherein the one or more catalysts is bis(indenyl) zirconium dichloride, wherein the one or more cocatalysts comprises a first cocatalyst, a second cocatalyst, and a third cocatalyst, wherein the first cocatalyst is N,N-dimethylanilinium tetrakis(pentaflourophenyl) borate, wherein the second cocatalyst is methylaluminoxane, and the third cocatalyst is triisobutyl aluminum.

9. The method of claim 1, wherein a vinyl norbornene content of the copolymer is at least 2.0 wt % of the copolymer.

10. The method of claim 1, wherein a propylene content of the copolymer is at least 50 wt % of the copolymer, and wherein a vinyl norbornene content of the copolymer is at least 8.0 wt % of the copolymer.

11. The method of claim 1, wherein the copolymer has an ethylene:propylene ratio from about 40:60 to about 80:20.

12. The method of claim 1, wherein the adding propylene and the catalyst mixture to the solvent in the reactor to make a first reaction mixture is carried out at a propylene flow rate of about 1.0 gram/minute to about 100.0 grams/minute.

13. The method of claim 1, wherein the solvent is hexane.

14. The method of claim 1, wherein the copolymer has a weight average molecular weight from about 2,500 g/mol to about 250,000 g/mol.

15. The method of claim 1, wherein the copolymer has a viscosity from about 1,000 cP to about 700,000 cP at 100° C.

16. The method of claim 1, wherein the copolymer is a liquid at room temperature.

17. The method of claim 1 further comprising contacting the copolymer with a curing agent to make a crosslinked copolymer.

18. The method of claim 17, wherein the curing agent is selected from one or more peroxides, one or more amines, one or more sulfur compounds, organosiloxanes, 2,2'-(4-methylphenylimino) diethanol, or mixtures thereof.

19. The method of claim 18, wherein the crosslinked copolymer has a viscosity from about 1,000 cP to about 2,500,000 cP at 100° C.

* * * * *